(12) United States Patent
Goad

(10) Patent No.: US 9,278,478 B2
(45) Date of Patent: *Mar. 8, 2016

(54) METHODS AND APPARATUS FOR LINING PROCESS TANKS

(76) Inventor: Curtis Goad, Ballwin, MO (US)

( * ) Notice: Subject to any disclaimer, the term of this patent is extended or adjusted under 35 U.S.C. 154(b) by 276 days.

This patent is subject to a terminal disclaimer.

(21) Appl. No.: 13/396,231

(22) Filed: Feb. 14, 2012

(65) Prior Publication Data

US 2012/0148805 A1 Jun. 14, 2012

Related U.S. Application Data

(63) Continuation-in-part of application No. 11/697,243, filed on Apr. 5, 2007, now Pat. No. 8,133,345.

(51) Int. Cl.
*B29C 65/00* (2006.01)
*B29C 65/42* (2006.01)
(Continued)

(52) U.S. Cl.
CPC ............. *B29C 63/30* (2013.01); *B29C 47/0002* (2013.01); *B29C 63/486* (2013.01); *B29C 65/12* (2013.01); *B29C 65/42* (2013.01); *B29C 65/4815* (2013.01); *B29C 65/525* (2013.01); *B29C 65/54* (2013.01); *B29C 66/1142* (2013.01); *B29C 66/1162* (2013.01); *B29C 66/342* (2013.01); *B29C 66/43* (2013.01); *B29C 66/4326* (2013.01); *B29C 66/4342* (2013.01); *B29C 66/43421* (2013.01); *B29C 66/532* (2013.01); *B29C 66/61* (2013.01); *B29C 66/836* (2013.01); *B29C 66/861* (2013.01); *B29C 47/0009* (2013.01); *B29C 63/0047* (2013.01); *B29C 65/125* (2013.01); *B29C 65/425* (2013.01); *B29C 66/71* (2013.01); *B29C 66/7254* (2013.01); *B29C 2063/021* (2013.01);

(Continued)

(58) Field of Classification Search
CPC .... B29C 63/30; B29C 47/0002; B29C 66/61; B29C 66/1162; B29C 63/486; B29C 66/861; B29C 65/12; B32B 3/02; B32B 37/24; Y10T 428/24777; Y10T 428/24802
USPC ............ 156/71, 256, 258, 293, 304.1, 304.6; 206/524.3; 220/651
See application file for complete search history.

(56) References Cited

U.S. PATENT DOCUMENTS 3,279,971 A 10/1966 Gardener
3,485,409 A 12/1969 Becker
(Continued)

OTHER PUBLICATIONS

Extrusion Welding of Thermoplastics, the Professional Division of the Welding Institute, Mar. 2002, http://www.twi.co.uk/professional/protected/band_3/jk56.html.
(Continued)

*Primary Examiner* — Mark A Osele
*Assistant Examiner* — Christopher C Caillouet
(74) *Attorney, Agent, or Firm* — Harness, Dickey & Pierce, P.L.C.

(57) ABSTRACT

Disclosed herein are exemplary embodiments of linings, liners, and methods of providing a liner or lining for a tank. An exemplary embodiment includes a method of providing a liner or lining for a tank. In this exemplar embodiment, the method includes extrusion welding a pair of sheets together by infusing a molten thermoplastic material along an interface and within a gap between the pair of sheets. The method also includes extrusion welding the pair of sheets to a bottom sheet by infusing the molten thermoplastic material along and between the pair of sheets and the bottom sheet.

25 Claims, 11 Drawing Sheets

(51) Int. Cl.
  *B29C 63/30* (2006.01)
  *B29C 47/00* (2006.01)
  *B29C 63/48* (2006.01)
  *B29C 65/12* (2006.01)
  *B29C 65/48* (2006.01)
  *B29C 65/54* (2006.01)
  *B29C 65/52* (2006.01)
  *B29C 63/00* (2006.01)
  *B29C 63/02* (2006.01)
  *B29K 101/12* (2006.01)
  *B29K 305/00* (2006.01)
  *B29L 31/00* (2006.01)

(52) U.S. Cl.
  CPC ........ *B29K 2101/12* (2013.01); *B29K 2305/00* (2013.01); *B29L 2031/7126* (2013.01); *Y10T 428/24777* (2015.01); *Y10T 428/24802* (2015.01)

(56) References Cited

U.S. PATENT DOCUMENTS

| | | | |
|---|---|---|---|
| 3,658,627 A | 4/1972 | Kaminsky | |
| 3,853,669 A | 12/1974 | Werstlein | |
| 3,927,233 A * | 12/1975 | Naidoff | B29C 66/73756 138/178 |
| 3,951,308 A | 4/1976 | Thirtle | |
| 4,102,726 A | 7/1978 | Brackman | |
| 4,457,457 A | 7/1984 | Dziki | |
| 4,796,676 A | 1/1989 | Hendershot et al. | |
| 4,942,978 A | 7/1990 | Bessette | |
| 5,322,539 A * | 6/1994 | Mathisen | C03B 20/00 220/678 |
| 5,345,666 A | 9/1994 | Matyja | |
| 5,368,073 A * | 11/1994 | Murphy | F16L 55/053 138/26 |
| 5,505,814 A | 4/1996 | Gläser et al. | |
| 5,804,112 A | 9/1998 | Greene | |
| 5,814,175 A * | 9/1998 | Rau | B29C 66/71 156/157 |
| 5,820,718 A | 10/1998 | Dean | |
| 5,836,363 A | 11/1998 | LaFleur | |
| 5,867,883 A | 2/1999 | Iorio et al. | |
| 5,979,686 A | 11/1999 | Dean | |
| 6,394,534 B1 | 5/2002 | Dean | |
| 6,431,387 B2 | 8/2002 | Piehler | |
| 6,579,439 B1 | 6/2003 | Chandler | |
| 7,111,497 B2 | 9/2006 | Goad et al. | |
| 2001/0004992 A1 | 6/2001 | Kawasaki et al. | |
| 2001/0011672 A1 | 8/2001 | Aota et al. | |
| 2001/0023566 A1 | 9/2001 | Ezumi et al. | |
| 2002/0119336 A1 | 8/2002 | Kawasaki et al. | |
| 2003/0056459 A1 | 3/2003 | Ezumi et al. | |
| 2004/0060857 A1 * | 4/2004 | Pattee | 210/232 |
| 2004/0067381 A1 | 4/2004 | Grund et al. | |
| 2005/0011159 A1 | 1/2005 | Standal et al. | |
| 2005/0129796 A1 | 6/2005 | Bortoli | |
| 2006/0051442 A1 | 3/2006 | Miceli et al. | |
| 2006/0054661 A1 | 3/2006 | Di Miceli et al. | |
| 2006/0057241 A1 | 3/2006 | De Miceli et al. | |
| 2008/0245471 A1 | 10/2008 | Goad | |
| 2010/0025337 A1 | 2/2010 | Yencho | |
| 2012/0121359 A1 | 5/2012 | Bray et al. | |

OTHER PUBLICATIONS

Plastic Welding, The Plastics Distributor & Fabricator, Mar./Apr. 2003, http://www.plasticsmag.com/features.asp?fIssue=Mar/Apr-03.

Tanks and Liners: Is Conventional Wisdom or Reliance on Internet-Based Answers Putting you Company at Risk?; Curtis Goad; Dec. 3, 2010; http://www.pfonline.com/articles.

Office Action issued in U.S. Appl. No. 13/427,426, which is not related through a priority claim but includes the same inventor, dated Nov. 18, 2013; 11 pgs.

* cited by examiner

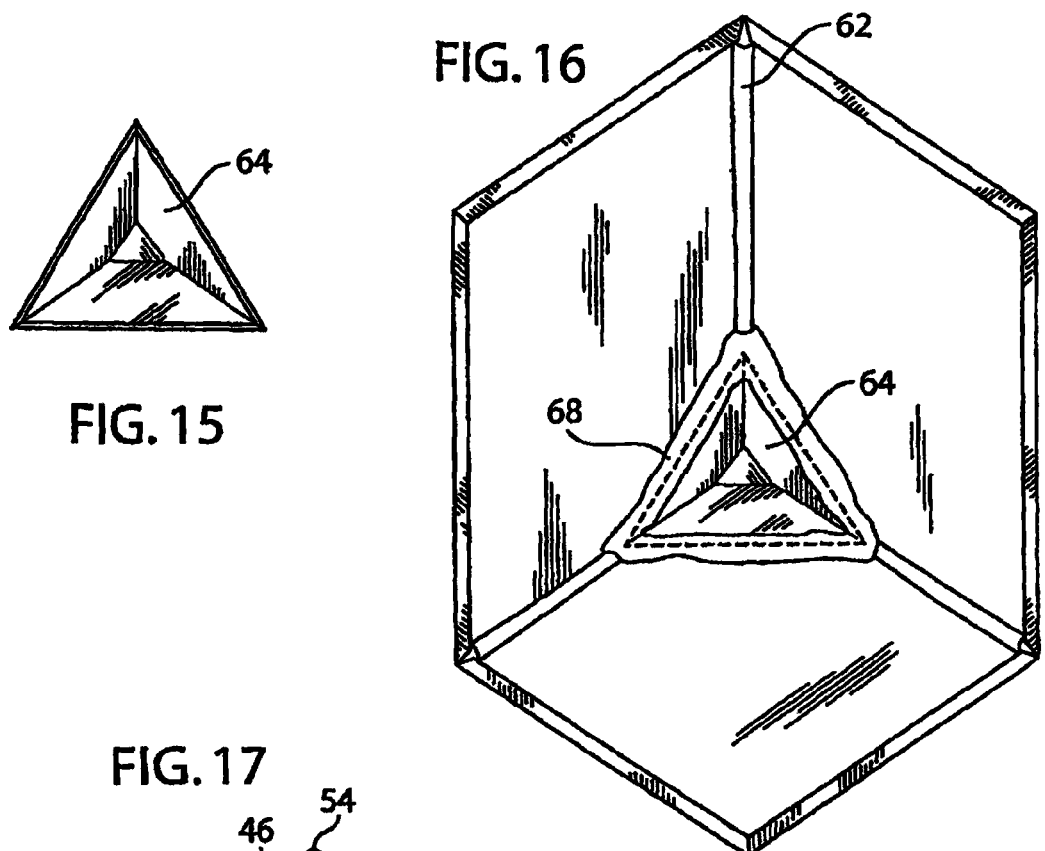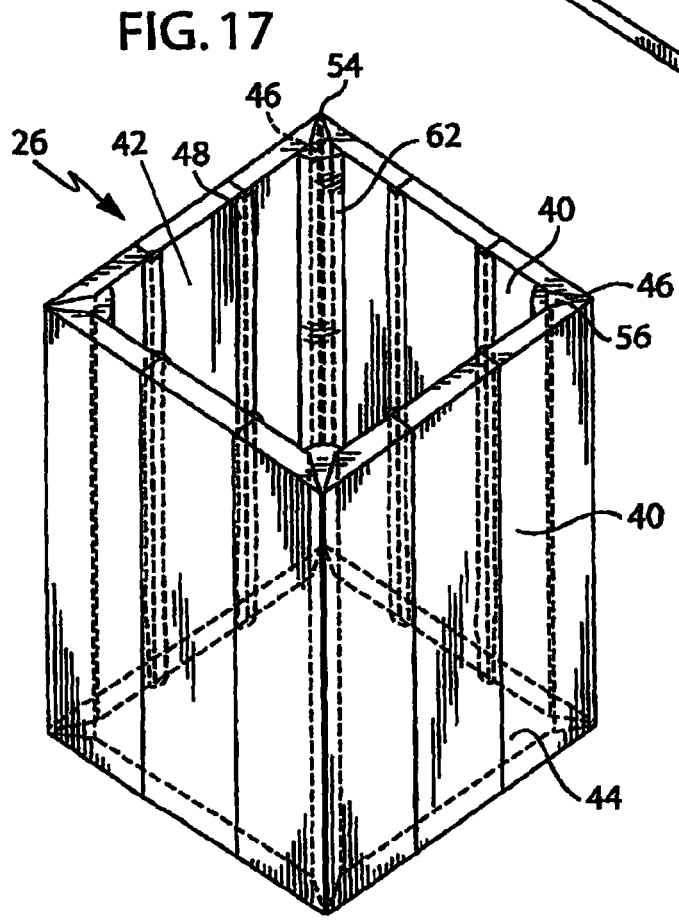

METHODS AND APPARATUS FOR LINING PROCESS TANKS

CROSS-REFERENCE TO RELATED APPLICATION

This application is a continuation-in-part of U.S. patent application Ser. No. 11/697,243 filed Apr. 5, 2007. The entire disclosure of the above application is incorporated herein by reference.

FIELD

The present disclosure generally relates to process tanks, liners, linings, and methods of lining process tanks.

BACKGROUND

This section provides background information related to the present disclosure which is not necessarily prior art.

Currently, contents such as acids and chemicals are stored in tanks usually in the form of process tanks. These tanks relate to immobile types that may be installed above or below the ground, but also for the transportable types that are part of the over-the-road semi-trailers. The tanks may also be used on or in marine vessels as well as railroad cars. The size of the tank is not material, but the larger process tanks typically hold 1,000 gallons or more. Moreover, process tanks are particularly adaptable for tanks intended for highly corrosive liquids, but also may be used in conjunction with other pourable materials such as grain and pellets.

Most process tanks of the type considered are steel tanks which, over a period of time, may become corroded as a result of the fluids stored therein, or because of the rusting action of the exterior elements (e.g., ground water, rain, etc.). If the material stored in such tanks is corrosive, the corrosive material can contact the tank. In this situation, the life expectancy of the tank is relatively short and thus it becomes not only extremely expensive for replacement, but also highly dangerous for people and the environment. Furthermore, there is danger in the event that the tanks leak or are ruptured, or somehow fail to retain the contents and leak the contents into the ground (if the tanks are subterranean). If they are above-the-ground storage tanks or if the tanks are over-the-road type, there is danger along the highways and to the passing public. Accordingly, many process tanks utilize a protective liner or protective lining.

One common type of liner is a pre-fabricated "drop-in" liner. While drop-in liners may be machine welded (radio frequency welding is commonly used for these liners), the drop-in liners have disadvantages with respect to a bonded lining. During the drop-in process, air is entrapped behind the liner, which can condense and cause the mild steel tank to rust. Furthermore, during the drop-in process, creases form in the liner sheet, which stresses the liner material and leads to premature cracking and failure. Additionally, a tank part may catch the crease or protruding wrinkle and cause tear damage to the drop-in liner. When the drop-in liner develops a leak, solution seeps behind the liner pushing it off the walls or bottom and causing the liner itself to move into the process tank area resulting in operational problems. Once solution is behind a drop-in liner, the liner is very difficult to repair, since it may be almost impossible to find the source of the leak. Replacing the drop-in liner creates significant downtime, especially for electroplating tanks with auxiliary equipment affixed to the tank rim, e.g., ventilation hoods, piping, anode and cathode bars, heat exchangers and probes, level control devices, etc.

Also commonly used are bonded-to-metal linings. As will be discussed, this type of lining uses manual "flat strip" welds on the butted side panels and "corner strip" welds on the vertical joining walls and side to bottom joints.

In current lining procedures, installation personnel prepare the interior of the surface of the tank 10 (FIG. 1) to receive the lining 14. This preparation includes surface blasting the interior of the tank 10 and subsequent cleaning of the interior of the tank 10.

With respect to the lining 14, the installer cuts sheets of lining 16 (FIG. 2) from a roll of lining material. At the installation site, the installer applies an adhesive to the now cut sheets of lining 16. Then, the installer manually applies the lining sheets 16 to the interior of the tank 10. As known in the art, heat may be applied to the lining sheets 16 to assist in applying the lining sheets 16 to the tank wall. Tanks typically have protrusions such as tank welds that bond the tank walls to the tank bottom. These tank welds protrude into the interior of the tank 10. Even careful placement of the sheets 16 will result in gaps between the sheets 16 that are placed over the protruding welds. In other words, the sheets 16 will lay over the protrusions further enhancing the gaps between the sheets 16.

As shown in FIG. 2, current cutting procedures result in uneven and/or rough edges 128 for each lining sheet 16. When the installer bonds the sheets 16 to the tank 10 and next to each other, the rough edges 128 of the sheets 16 do not evenly match thus resulting in gaps 20 forming between the sheets 16. When the installer cuts relatively smooth edges 128, installation gaps 20 still exist between the adjacent sheets 16 due to the difficult and labor intensive installation process (FIG. 3). For example, the sheets 16 are heavy and difficult to manage as the installer handles the sheets 16 while positioned within the tight constraints of the process tank 10 which is a confined space with elevated temperatures. As such, the installer may apply adjacent sheets 16 in a non-uniform layout and/or with a distance between them, further enhancing the gaps 20 between the edges 128 of the sheets 16. Applying the sheets 16 at a corner of the tank 10 is particularly troublesome due to the space and angle considerations of the corner of the tank 10.

After applying the lining sheets 16, the installer welds a weld strip 22 (known as a "cap over flat strip weld" or a "cap over corner strip weld") along the interface between a pair of adjacent sheets 16 (FIGS. 2 and 3). The installer manually welds the weld strip 22 to the adjacent lining sheets 16. The welder used by the installer in this process heats the weld strip 22 to the sheets 16. Similar to the application of the sheets 16, hand welding the weld strips 22 is a labor-intensive process. Maintaining consistent pressure with the welder is difficult since the touch of the installer applies the pressure. Additionally, it is difficult with the hand welder to maintain a constant distance between the welding nozzle and the welding strip. Furthermore, the weld strip may melt faster than the sheet 16, so the welding process must be done with special care. The sheets 16 must be heated to a glossy state, yet the weld strip or the sheets 16 cannot be charred, as that would result in a failed weld.

The installer typically welds from the top of the lining sheet 16 to the bottom. As the process tank 10 may have a height such as twelve feet, this height causes starts and stops as opposed to continuous welds with tightly controlled temperatures and consistency in both pressure and timing. In addition, welding occurs within the tight constraints of the process tank 10 such that the installer does not provide a constant weld over any length of time. The tedious and laborious process for strip welding not only applies to welding strips to corner sheets, but it also applies to welding strips for sheets applied to the walls of the process tank 10.

The human element of welding the strips 22 leads to weak welds (inconsistency of temperature, pressure and timing—the critical variables for welds) and leads to voids or "pinholes" 24 within the weld that bonds the weld strip 22 to the sheets 16 (FIG. 4). The pinholes 24 shown in FIG. 4 are exaggerated for purposes of clarity. Although the welded strip 22 may pass a "spark test" commonly used in the art, these pinholes 24 lead to problems for the process tank 10 as will be discussed. Furthermore, the corner weld that bonds sides and the bottom of the process tank 10 further exaggerates the effects of the gaps 20 and the pinholes 24 since the sheet 16 must position over the corner weld of the process tank 10. This corner weld or other obstacle leaves a void between the sheet 16 and the tank weld.

When the tank 10 is filled with fluid 12 (FIG. 1) such as an acid, the pressure of the fluid forces the fluid through the pinholes 24. Consequently, the fluid forces through the gaps 20 and disperses between the lining 14 and the tank 10. This leaked fluid then corrosively attacks the tank wall. Additionally, this leaked fluid may also corrosively attack the bond or adhesive interface between the lining 14 and the tank wall resulting in the lining 14 pulling away from the tank wall. Accordingly, the gaps 20 and the pinholes 24 between the lining sheets 16 lead to adverse and dangerous conditions. When the installer repairs the welded strip, the heat from the repair welder draws the leaked fluid toward the interface of the adjacent sheets 16, wherein this fluid further attacks the tank wall positioned behind the repaired weld strip.

SUMMARY

This section provides a general summary of the disclosure, and is not a comprehensive disclosure of its full scope or all of its features.

Disclosed herein are exemplary embodiments of linings, liners, and methods of providing a liner or lining for a tank. An exemplary embodiment includes a method of providing a liner or lining for a tank. In this exemplar embodiment, the method includes extrusion welding a pair of sheets together by infusing a molten thermoplastic material along an interface and within a gap between the pair of sheets. The method also includes extrusion welding the pair of sheets to a bottom sheet by infusing the molten thermoplastic material along and between the pair of sheets and the bottom sheet.

Another exemplary embodiment includes a lining or liner for a tank. In this exemplary embodiment, the lining includes a bottom sheet and a plurality of side sheets. The plurality of side sheets are configured such that a gap is between at least one pair of adjacent side sheets of the plurality of side sheets. The pair of adjacent side sheets is joined by an extrusion weld infused within the gap and along an interface between the pair of adjacent side sheets.

In another exemplary embodiment, a tank includes a bottom sheet and a plurality of side sheets. The plurality of side sheets are configured such that a gap is between a pair of adjacent side sheets of the plurality of side sheets. The pair of adjacent side sheets is joined by an extrusion weld infused within the gap and along an interface between the pair of adjacent side sheets.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 15 is front view of an exemplary embodiment of a corner insert constructed in accordance with and embodying one or more aspects of the present disclosure;

FIG. 16 is a partial perspective view illustrating the corner insert shown in FIG. 15 extrusion welded to a corner of a lining;

FIG. 17 is a perspective view of an exemplary embodiment of a lining constructed in accordance with and embodying one or more aspects of the present disclosure;

Figure 24:
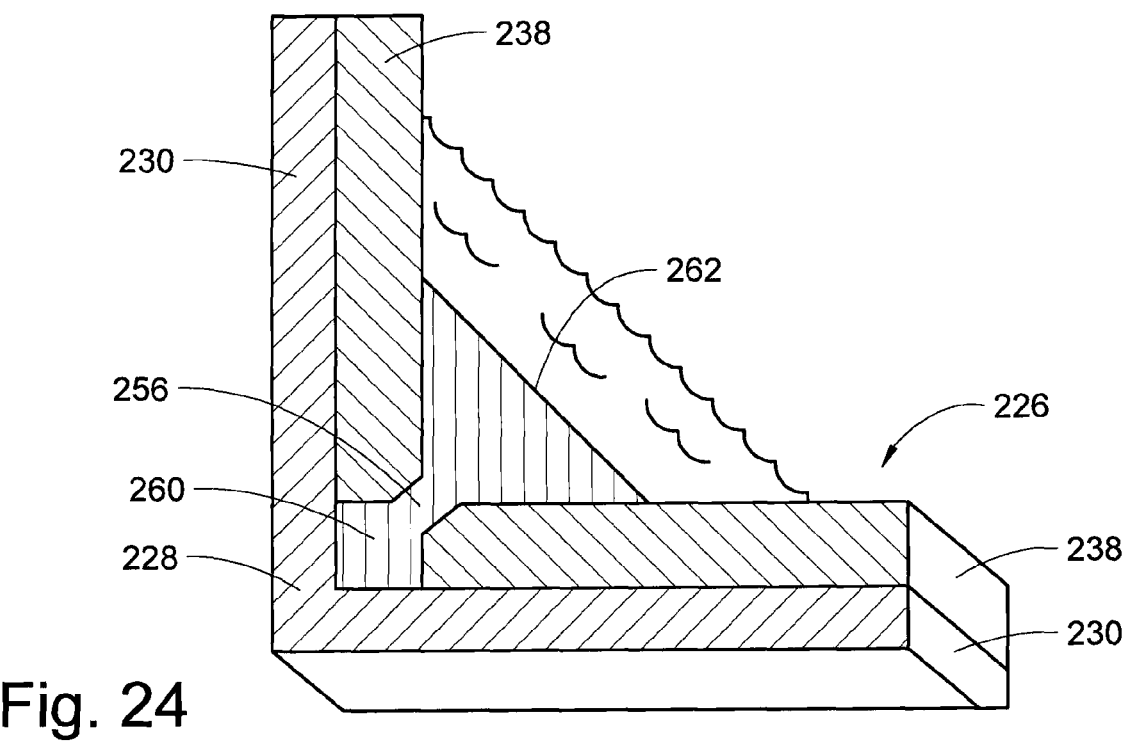
Figure 25:
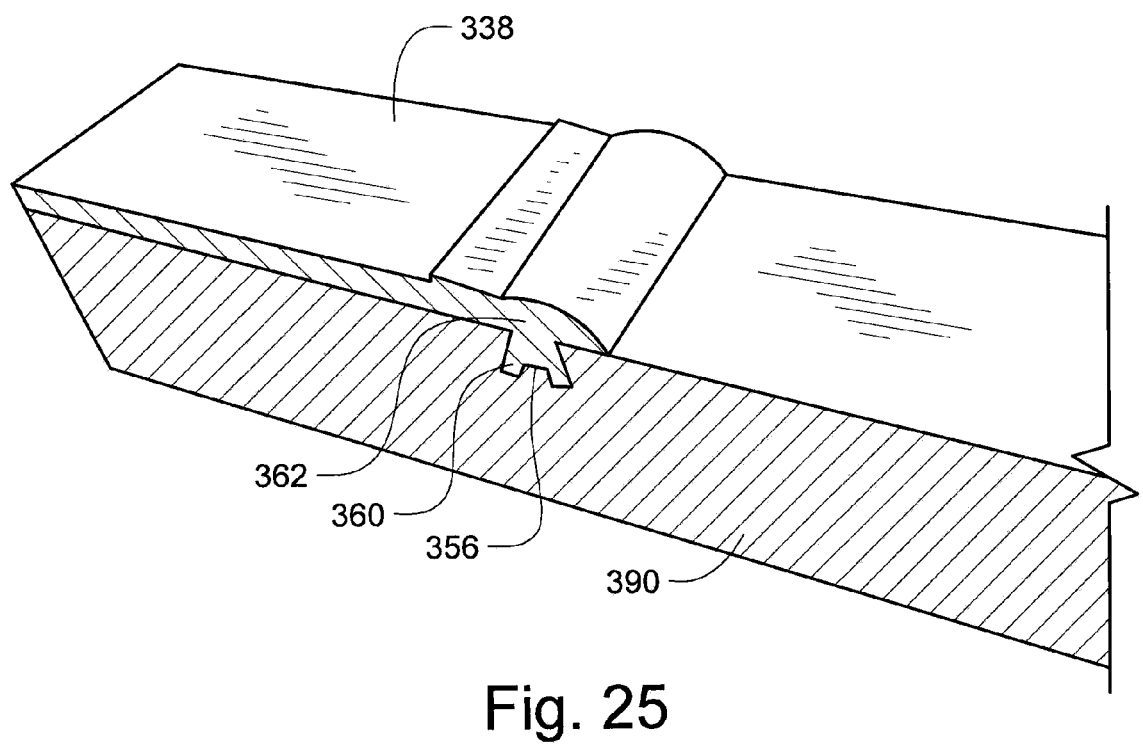

FIG. 24 is a partial side perspective view of an exemplary embodiment of a lining applied to walls of a tank, which lining includes sheets separated by a gap and joined by an infused weld that also fills the gap between the sheets in accordance with and embodying one or more aspects of the present disclosure; and FIG. 25 is a partial perspective view of an exemplary embodiment of a lining sheet applied to a wooden flooring member, and illustrating an infused weld joining the lining sheet to the flooring member in accordance with and embodying one or more aspects of the present disclosure.

DETAILED DESCRIPTION

Example embodiments will now be described more fully with reference to the accompanying drawings.

As explained in the background above, the inventor hereof has identified various drawbacks with conventional methods for lining storage or process tanks. As recognized by the inventor hereof, process tanks with bonded linings should have a lining that eliminates gaps between edges of adjacent lining sheets or panels. The inventor further recognized that linings for process tanks should have machine quality consistent strong welds created with consistent pressure, temperature, and timing that effectively seals the tank from the contents that contact the lining.

Accordingly, the inventor hereof discloses exemplary embodiments methods of lining tanks in which sheets or panels of the lining are extrusion welded together by infusing molten thermoplastic material within the interfaces of adjacent sheets. Also disclosed herein are exemplary embodiments of linings, liners, and tanks that may be formed by sheets or panels extrusion welded together by infused thermoplastic material. For descriptive purposes only, the terms "liner" and "lining" may be used interchangeably herein. Also for descriptive purposes only, the term "liner" may also be used herein to refer to a free standing liner (e.g., drop-in liner, etc.) for a tank which liner will not be or is not bonded to a tank's surfaces. Additionally, the term "lining" may also be used herein to refer to a lining for a tank that will be or is bonded to a tank's surfaces.

An exemplary embodiment relates to a method of lining a tank having walls and a bottom that intersect at a corner of the tank. In this exemplary embodiment, the method includes bonding a bottom sheet to the bottom of the tank. The method also includes bonding a pair of sheets to adjacent walls of the tank above the bottom sheet. Each sheet of the pair of sheets has a first edge and a second edge such that the first edges of the pair of sheets are positioned at the intersection of adjacent walls of the tank. The pair of sheets is then extrusion welded together by infusing a molten thermoplastic material along the pair of sheets and within an interface between the pair of sheets. Additionally, the method includes extrusion welding the pair of sheets to the bottom sheet by infusing molten thermoplastic material along and between the pair of sheets and the bottom sheet. The infused thermoplastic material seals the pair of sheets and bottom sheet to thereby isolate the lined tank from the contents (e.g., contents being stored and/or processed, etc.) within the lined tanks, as the contents contact the pair of sheets and bottom sheet instead of the tank walls and bottom.

In exemplary embodiments, molten thermoplastic weld material flows into and fills gaps between adjacent pairs of lining sheets or panels, and also penetrates the joint to the substrate (e.g., the tank wall, etc.). An infused weld area is thus created that helps to eliminate channels, pinholes, gaps, etc. behind the weld seams, which, in turn, helps reduce the probability of leaks and helps increase the service life of the tank, pit, storage vessel, etc. in which the lining is used. If a leak happens, then the weld also helps block solution from flowing behind the lining.

Figure 5:
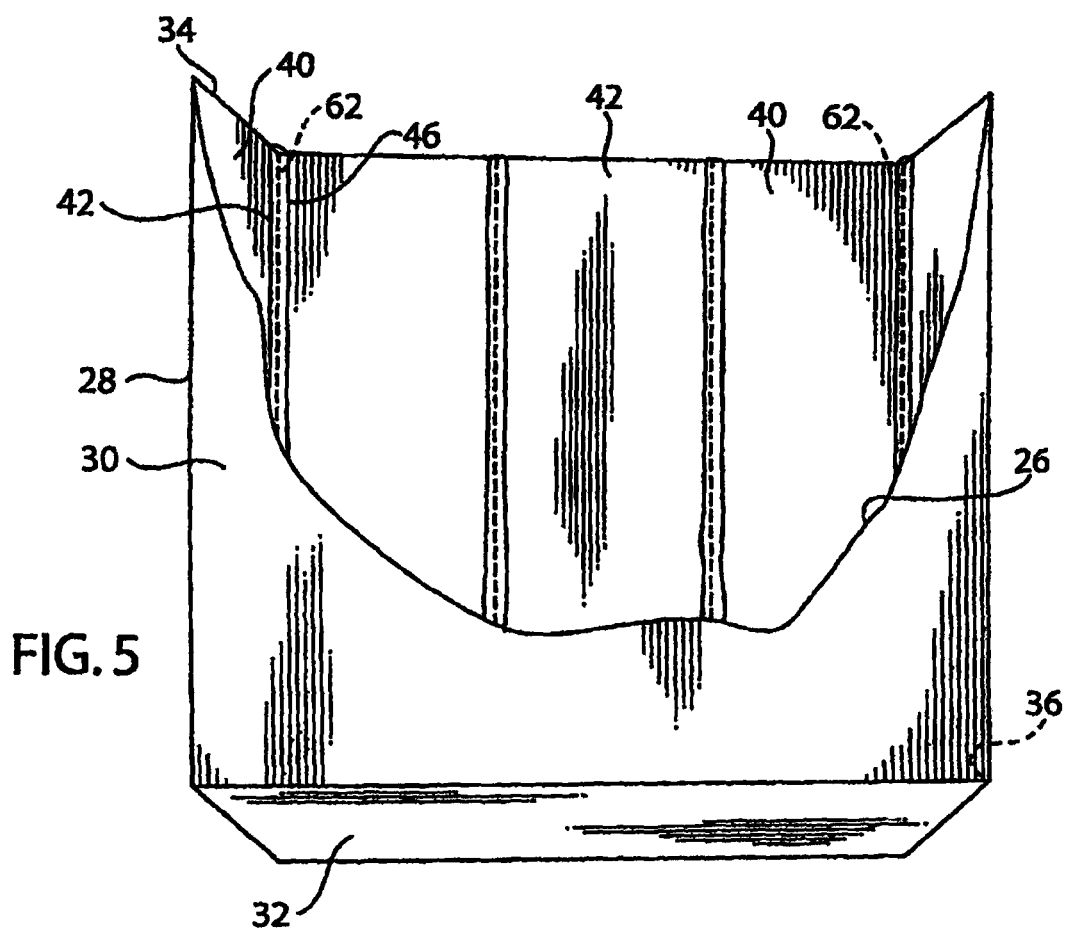
FIG. 5 is a partial sectional front view of an exemplary embodiment of a lining within a tank, which lining is constructed in accordance with and embodying one or more aspects of the present disclosure.

With reference to the figures, FIG. 5 illustrates an exemplary embodiment of a lining 26 applied to a tank 28. As shown in FIG. 5, the tank 28 has walls 30, a bottom 32, and a top 34. The walls 30 and bottom 32 intersect at corners 36 of the tank 28. The tank 28 may also include a cover (not shown) and other components (not shown), such as a manhole access, access doors, and supply/drain valves. By way of example only, the tank 28 may comprise a steel process tank. But other exemplary embodiments may include a lining or liner (e.g., lining 26, etc.) that is configured for differently configured tanks than what is shown in FIG. 5, such as tanks, pits, storage vessels, etc. formed from different materials (e.g., concrete, fiberglass, wood, etc.) and/or tanks shaped differently, etc. By way of further example, liners or linings disclosed herein may also be used for lining a floor in a process room, for lining a concrete floor and containment area, for lining outdoor or indoor containment pits, etc. The inventor's liners, linings, and welding techniques disclosed herein may be used with steel, wood, concrete, fiberglass, and other substrates that require corrosion protection.

An exemplary method for providing the lining 26 to the tank 28 will now be provided. In this example, installation personnel may prepare the tank 28 prior to applying the lining 26 to the tank 28. For the surface preparation of the tank 28, the material should preferably be free from physical imperfections and sharp edges on the interior of the tank 28 and should preferably be ground smooth. The thickness and weight per square foot should preferably comply and be within ASTM (American Society for Testing and Materials) tolerances and AISA (American Iron and Steel Institute) tolerances. Furthermore, welded parts of the tank 28 should preferably be fabricated in accordance with standardized commercial practices to obtain a practical and uniform quality. Rectangular open tanks, in particular, should preferably be properly reinforced with girth angles in accordance with accepted practices in order to provide adequate structural strength and prevent bulging. If welding is required on inside corners of the tank, the welds should preferably be smooth with no porosity, high spot lumps, or pockets. The size construction and location of outlets, openings, and/or valve sleeves should preferably be fabricated in accordance with standardized commercial practice.

During preparation, the installer removes sharp edges on the interior surface of the tank 28. The installer then prepares the interior surface of the tank 28, such as by blasting or grinding the interior of the tank 28 to be free from oil, grease, and chemicals. The installer may grit blast steel to a white metal finish in accordance with steel structures and painting standards. The installer may also clean the surface by using steam-cleaning procedures, for example to remove rust, scale, and dirt. After blasting or grinding, remaining debris may then be removed from the tank 28 via brushing or vacuuming. Furthermore, the installer may apply a primer to prevent oxidation of metal surfaces.

With respect to the lining 26, an installer processes a plurality of sheets or panels 38 (FIGS. 6 and 7) that eventually form the lining 26. The installer may process the plurality of sheets 38 at the location of the tank 28 by cutting the sheets 38 from a roll of material. The installer may also process the plurality of sheets 38 from the roll of material at an offsite location. In an exemplary embodiment, the roll of material for the lining 26 comprises an extruded plasticized polyvinyl chloride (PVC) sheet membrane. One such material is sold under the brand name Koroseal® or High Performance Koroseal® manufactured by R.J.F. International Corporation. Other exemplary materials for the lining 26 include Amer-Plate® or T-Lock® or Arrow-Lock® from Ameron Protective Linings or Exceline from F.C. Witt Associates Ltd. In yet other embodiments, the lining 26 (or other linings and linings disclosed herein) may comprise various other materials, such as rigid PVC type 1, rigid PVC type 2, vinyl or specially formulated flexible PVC, chlorinated polyvinyl chloride (CPVC), polypropylene (PPL), copolymer polypropylene (CoPPL), fiberglass reinforced plastic (FRP), polytetrafluoroethylene (PTFE); ethylene chlorotrifluoroethylene copolymer (ECTFE), polyvinylidene fluoride (PVDF), rubber, etc. In some exemplary embodiments, the sheets 38 of the lining 26 may include full-size RF (radio frequency) welded high performance Koroseal® panels (e.g., Koroseal® flexible PVC sheets, etc.), which helps eliminate lining seams in tank walls and bottom.

During the cutting process, the installer pulls a portion of the lining material from the roll and places the portion over a cutting surface. In an exemplary embodiment, the height of the lining material is about eight to about ten feet and the width is about four to about eight feet. After the proper size of the length of the lining sheet 38 is determined and pulled from the roll of lining material, the installer then cuts off the portion from the roll material to form the plurality of sheets 38 (FIGS. 6 and 7) of lining material.

Figure 1:
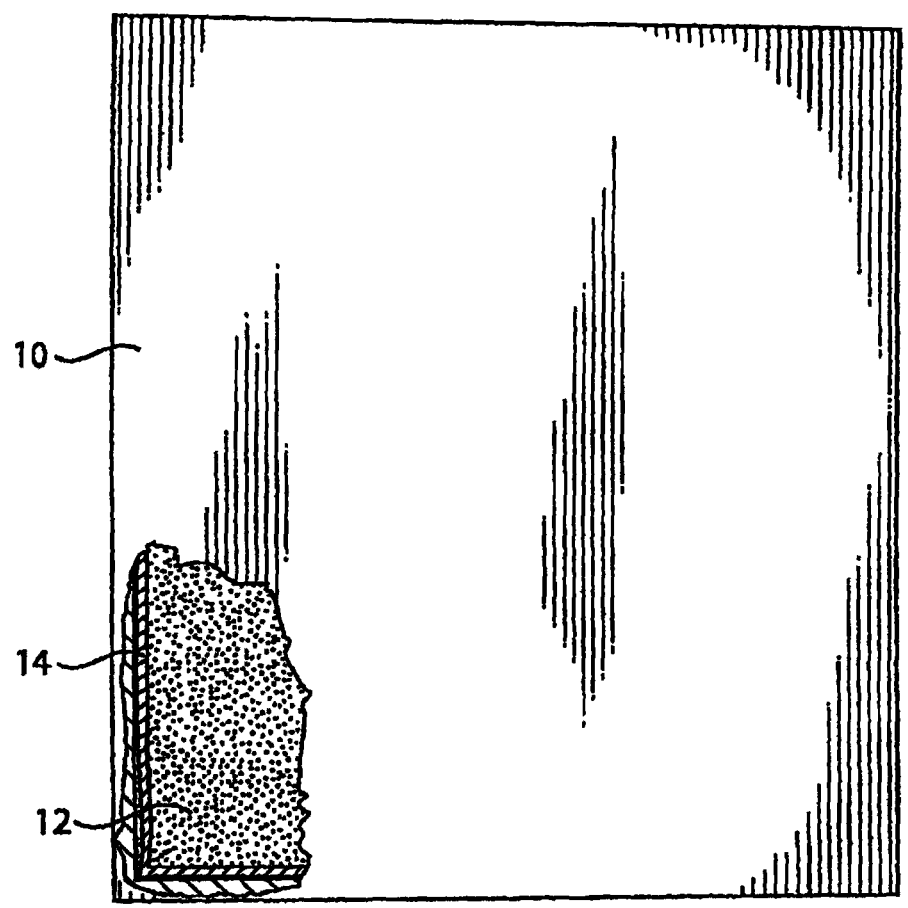
FIG. 1 is a front elevation view of a storage tank with a partial cross sectional view thereof illustrating a current bonded lining applied to the tank walls, and a fluid stored therein which fluid has seeped through the lining and is between the tank walls and the lining.
Figure 2:
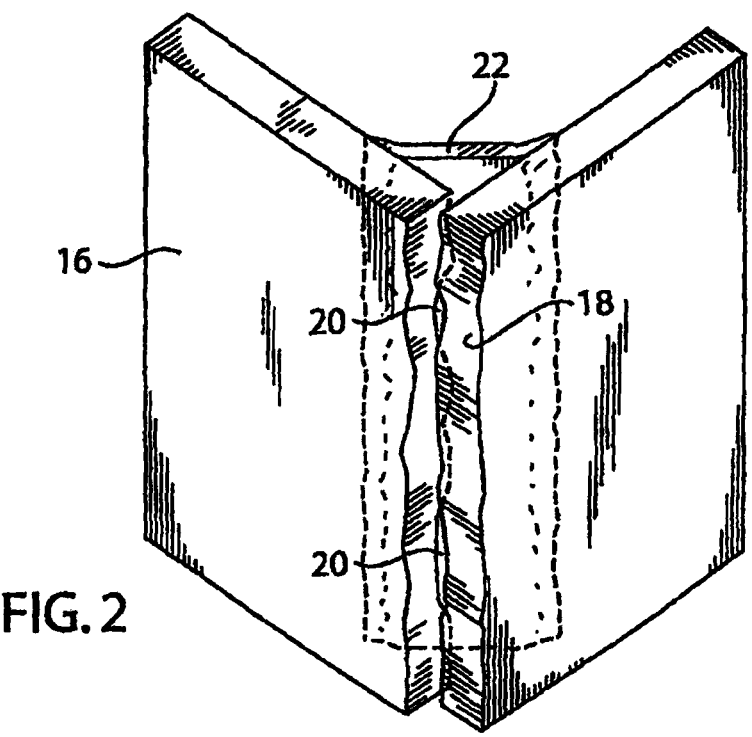
FIG. 2 is a partial perspective view of a corner of a current lining illustrating a pair of lining sheets, a welded strip weld between the pair of lining sheets, and gaps between the lining sheets.
Figure 3:
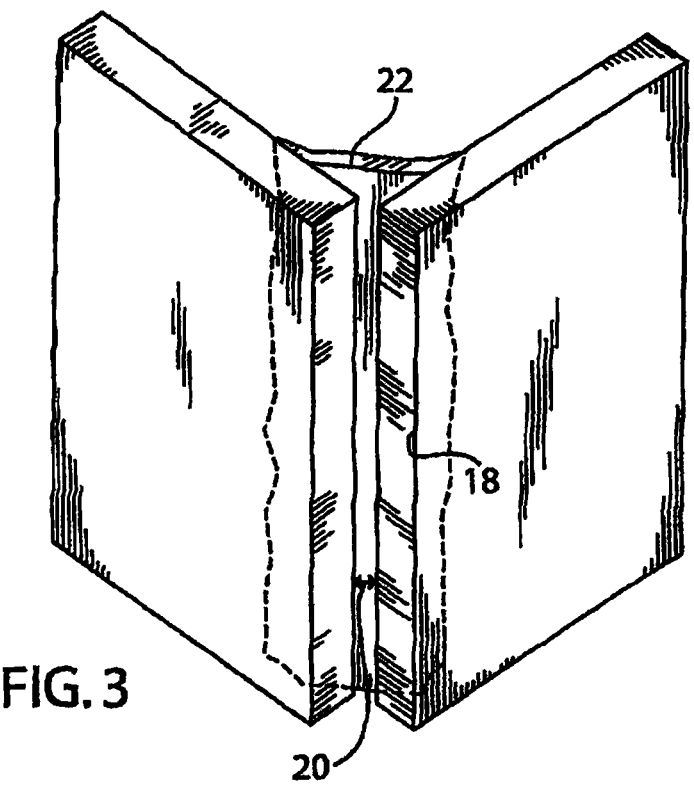
FIG. 3 is a partial perspective view of a corner of another current lining illustrating a pair of lining sheets having smooth edges, a welded strip weld between the pair of lining sheets, and a gap between and along the length of the edges of the lining sheets.
Figure 4:
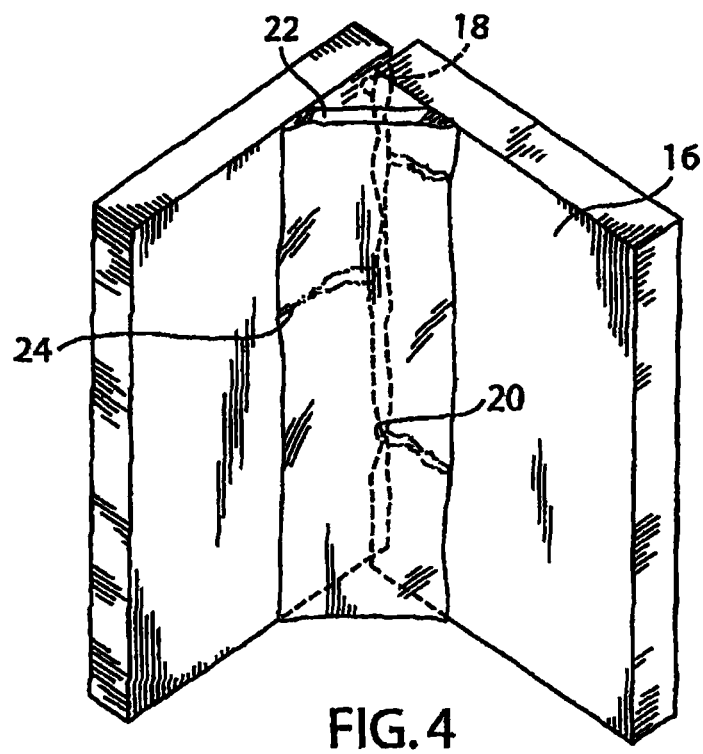
FIG. 4 is a front perspective view of the lining sheets, weld strip, and gaps shown in FIG. 3, and further illustrating pinholes formed in the weld that bonds the weld strip to the lining sheets.
Figure 6:
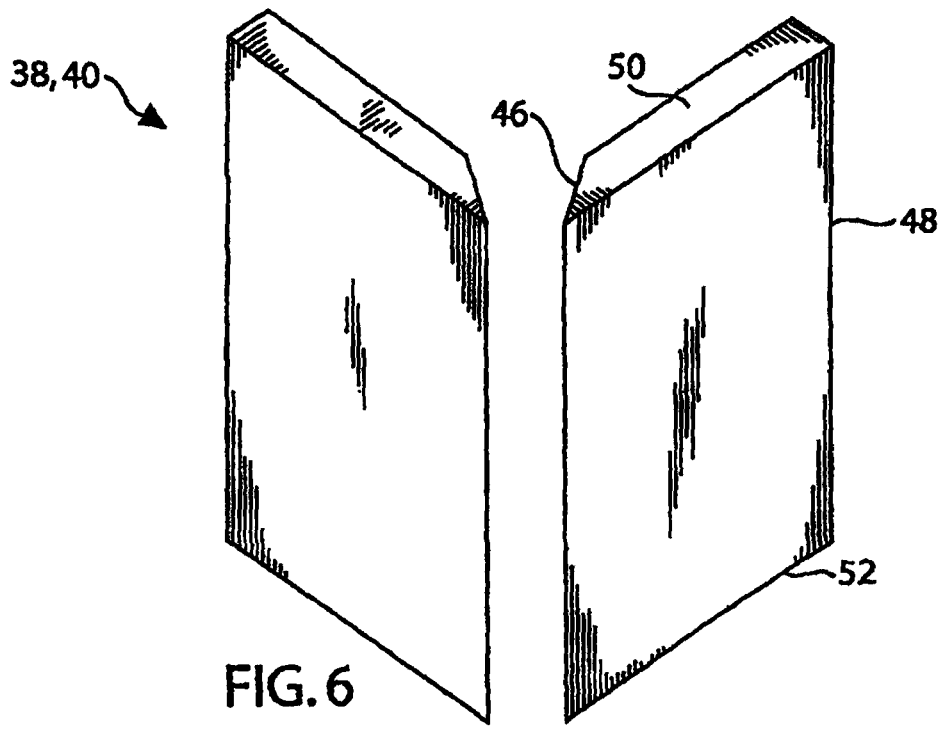
FIG. 6 is a back perspective view of an exemplary embodiment of a pair of lining sheets constructed in accordance with and embodying one or more aspects of the present disclosure.
Figure 9:
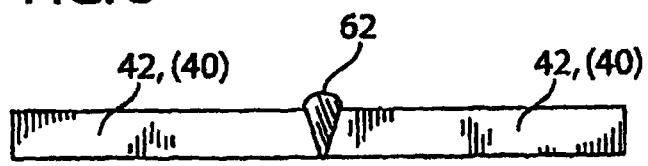
FIG. 9 is a plan view of an exemplary embodiment of a pair of extrusion welded side sheets constructed in accordance with and embodying one or more aspects of the present disclosure.
Figure 10:
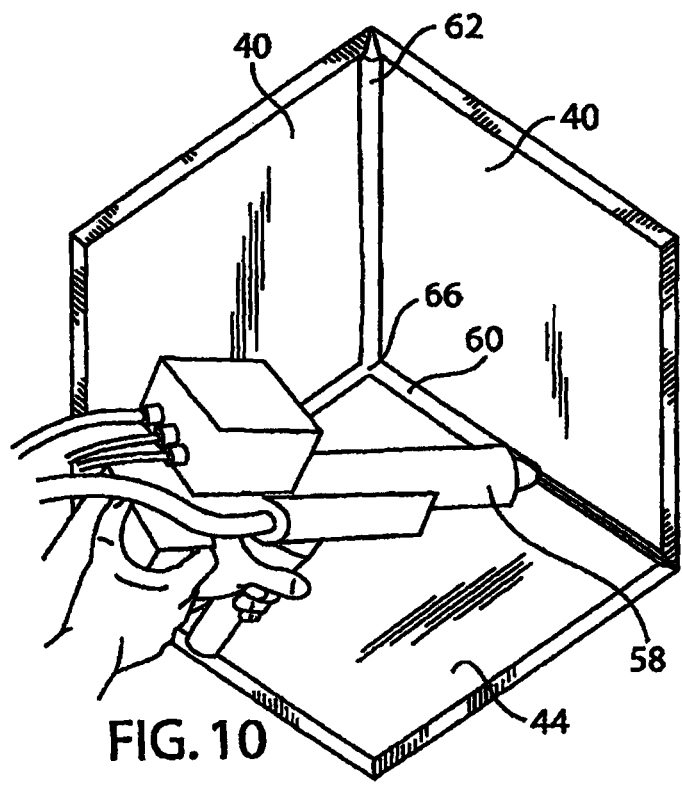
FIG. 10 is a partial perspective view of an infused weld being applied to the corner of the lining according to an exemplary embodiment of the present disclosure.

In the illustrated embodiment shown in FIG. 6, the sheets 38 have a rectangular configuration. The installer cuts the sheets 38 in dimensions for use on the walls 30 and the bottom 32 of the tank 28 (FIG. 1). The cut sheets are designated as corner pairs of sheets 40 (FIGS. 6 and 7), side sheets 42 (FIGS. 8 and 9), and bottom sheets 44 (FIG. 10). The lengths and configurations for the bottom sheets 44 are cut according to the interior surface of the bottom 32 of the tank 28 to which the lining 26 is being applied. The sheets 38 may contract and expand slightly in width during installation operations and during use due to thermal expansion and contraction. Allowance for such dimensional changes may be made when cutting the sheets 38. The installer may manually cut the sheets 38 from the roll of lining material. In an exemplary embodiment, the thickness of the sheets 38 is at least 3/32 inches. In another exemplary embodiment, the thickness of the sheets 38 is about 3/16 inches. These dimensions disclosed in this paragraph (as are all dimensions disclosed herein) are example in nature as other exemplary embodiments of a lining may be sized dimensionally larger or smaller depending on the tank to which they will be applied.

Figure 7:
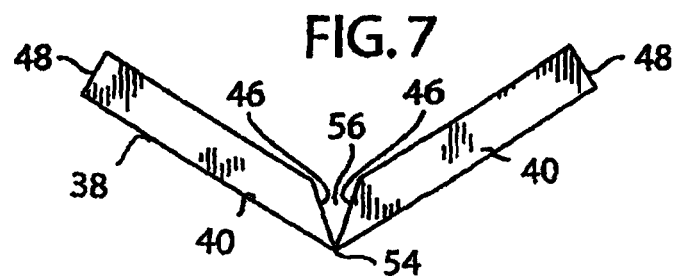
FIG. 7 is a plan view of the pair of lining sheets shown in FIG. 6 with the sheets contacting each other to form a corner beveled region.

As shown in FIGS. 6 and 7, each corner sheet 40 of the plurality of sheets 38 has a first edge 46, a second edge 48, a top edge 50, and a bottom edge 52. The installer separates the corner pair of sheets 40 so that the installer may further process the first edge 46 of each sheet 40. The installer may first process (cut or scrape) the first edge 46 of each sheet 40 in order to clear the edge from uneven surfaces. Next, the installer may then bevel the first edge 46. The installer uses a cutting apparatus to bevel the edges 46 at an acute angle. In an exemplary embodiment, the installer bevels the first edge 46 at about a 45 degree angle.

The installer then processes, such as by cutting or grinding, the second edge 48 of the sheets 40 in a substantially straight configuration in order to remove uneven surfaces. The installer may also bevel the second edge 48 of the sheets 40. In an exemplary embodiment, the installer bevels the second edges 48 at about a 45 degree angle.

The installer may also bevel the edges of the bottom sheet 44 at an acute angle. In an exemplary embodiment, the installer bevels these bottom edges at about a 45 degree angle.

Figure 8:
FIG. 8 is a plan view of an exemplary embodiment of a pair of butt welded side sheets constructed on a sheet butt welding machine in accordance with and embodying one or more aspects of the present disclosure.

For the sheets 38 that are not designated as corner sheets 40 or bottom sheets 44, the installer may process the edges of these side sheets 42 to remove uneven surfaces. In an exemplary embodiment, the installer processes these edges as substantially straight in a non-beveled configuration (FIG. 8). In another exemplary embodiment, the installer processes the edges of these sheets 42 in a beveled configuration (FIG. 9). These processes may be shop fabricated.

At the tank site, the installer cleans and prepares surfaces of the tank 28 and the backside of the sheets 38 so that the installer can apply adhesive cement (or other suitable adhesive) to both the prepared surfaces of the tank 28 and the back sides of the sheets 38. The installer, as part of the cleaning process, may swab the surface of the back of the sheets 38 with methyl ethyl ketone. In addition to, or alternatively to the adhesive cement, the installer may use double-sided adhesive tape between the tank 28 and sheets 38. In an exemplary embodiment, 3M® VHB (very high bond) tape may be used between the tank 28 and sheets 38 to help hold the lining 26 and sheets 38 thereof in place relative to the tank 28.

The installer may apply adhesive cement on the prepared surfaces of the tank 28 and the swabbed backsides of the sheets 38. More than one coat of adhesive cement may be applied to the tank surface and the backside of the sheets 38. When applying adhesive cement with a paint roller, for example, the installer may use a short roller in order to prevent excessive adhesive cement build up along the tank 28 surface and the backsides of the sheets 38. In the event the sheets 38 cannot be applied to the prepared surface of the tank 28 for an extended period of time and the adhesive cement loses its tack, the adhesive cement surface shall be refreshed or re-tackified by applying one or more additional coats of adhesive cement.

After the surface of the tank 28 and the back sides of the sheets 38 have been properly adhesively cemented, the installer bonds the bottom sheet 44 of the plurality of sheets 38 to the bottom 32 of the tank 28. The installer places the bottom sheet 44 against the prepared bottom 32 of the tank 28 and bonds the bottom sheet 44 to the bottom 32 of the tank 28. For example, the installer may roll or pressure the bottom sheet 44 to the bottom 32 of the tank 28 to avoid trapping air between the bottom sheet 44 and the tank 28. The bottom sheet 44 is bonded to the bottom 32 of the tank 28 making sure the bottom edges are positioned flush against the sidewalls 30 of the tank 28. Additionally, the installer may press and roll the bottom sheet 44 into the corners 36 in such a manner as to prevent bridging. In rolling out the air during the placement of the bottom sheet 44, the installer may roll from the center of the bottom sheet 44 and progressively from one end to the other to avoid pocketing air.

After bonding the bottom sheet 44, the installer bonds the pair of sheets 40 of the plurality of sheets 38 to adjacent walls 30 of the tank 28 and above the bottom sheet 44 such that the first edges 46 of the pair of sheets 40 are positioned at the intersection of adjacent walls 30 at the tank corner 36 of the tank 28 such that there is an interface 54 (FIG. 7) between the pair of sheets 40. Since the first edges 46 of the adjacent corner sheets may be beveled, the pair of sheets 40 is positioned at the corner intersection of the adjacent walls 30 to position a beveled region 56 between the pair of sheets 40 (FIG. 7).

The installer may then bond the pair of sheets 40 to the walls 30 of the tank 28 by rolling or by pressuring the pair of sheets 40 to the walls 30 of the tank 28 to avoid trapping air between the pair of sheets 40 and the walls 30 of the tank 28. The pair of sheets 40 is bonded to the walls 30 of the tank 28 making sure the bottom edges of the pair of sheets 40 are positioned flush against the bonded bottom sheet 44. The installer presses and rolls the pair of sheets 44 into the corners 36 in such a manner as to prevent overslipping.

After the corner pairs of sheets 40 and bottom sheet 44 are properly bonded to the tank 28, the installer then activates a handle-held extrusion-welding device 58 (FIG. 10). In this example, the welding device 58 is made up essentially of a hand-held drill serving as the drive system and removable attachment for this drill. In the attachment, a strand of thermoplastic material 60, supplied via one or several feed channels from a feed device, is chopped up. The thermoplastic material 60 is heated in a conveying device usually in the form of a worm conveyor and a plastering device so that the chopped thermoplastic material 60 reaches a plastic state and is then expelled as welding material through a welding chute of the welding device 58. The chute includes a degenerating device in the shape of an internal blower as well as a heating device. In exemplary embodiments, the thermoplastic material 60 may comprise permanent thermoplastic lining materials such as, but not limited to, plasticized polyvinyl chloride, flexible polyvinyl chloride (F-PVC), rigid polyvinyl chloride, chlorinated polyvinyl chloride (CPVC), polyethylene (e.g., high molecular weight polyethylene (HMWPE), high-density polyethylene (HDPE), low-density polyethylene (LDPE), etc.), polyurethane/PVC alloy, synthetic rubber, fluoropolymer (homopolymer, copolymers (e.g., Poly(vinylidene fluoride-co-hexafluoropropene) (PVDF-HFP), etc.) or alloys), ethylene-chloro-tri-fluoro-ethylene (Halar ECTFE), laminations of thermoplastic materials such as above, etc. Accordingly, exemplary embodiments include extrusion welding that comprises heating and forcing out, under constant pressure and temperature, the thermoplastic material 60.

Referring to FIG. 10 and turning to FIGS. 11-13 and FIG. 22, the installer extrusion welds the corner pair of sheets 40 together by infusing molten thermoplastic material 60 along the pair of sheets 40 and within the beveled region 56 of the pair of sheets 40. Infusing molten thermoplastic material 60 comprises introducing the thermoplastic material 60 through and/or over and/or into the intersection (the beveled region 56) of the associated sheets (the pair of sheets 40). Since the first edges 46 of the adjacent pair of sheets 40 are beveled, this extrusion welding infuses molten thermoplastic material 60 within the gap, void, or beveled regions 56 separating the beveled edges of the pair of sheets 40. Due to the uniformity of the beveled edges, the weld infuses within the beveled regions 56 to seal the pair of sheets 40 together. In welding the pair of sheets 40, the installer typically welds from the top of the interface 54 between the pair of sheets 40 to the bottom of the interface 54. The installer repeats the thermoplastic welding process for the other pair of sheets 40 bonded to the remaining corners of the tank 28.

Figure 11:
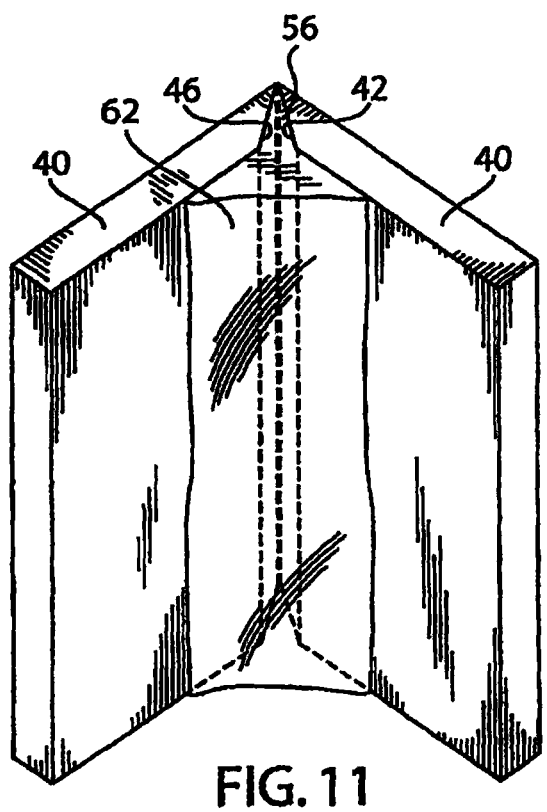
FIG. 11 is a front perspective view of the pair of lining sheets and associated infused weld shown in FIG. 10 constructed in accordance with and embodying one or more aspects of the present disclosure.
Figure 12:
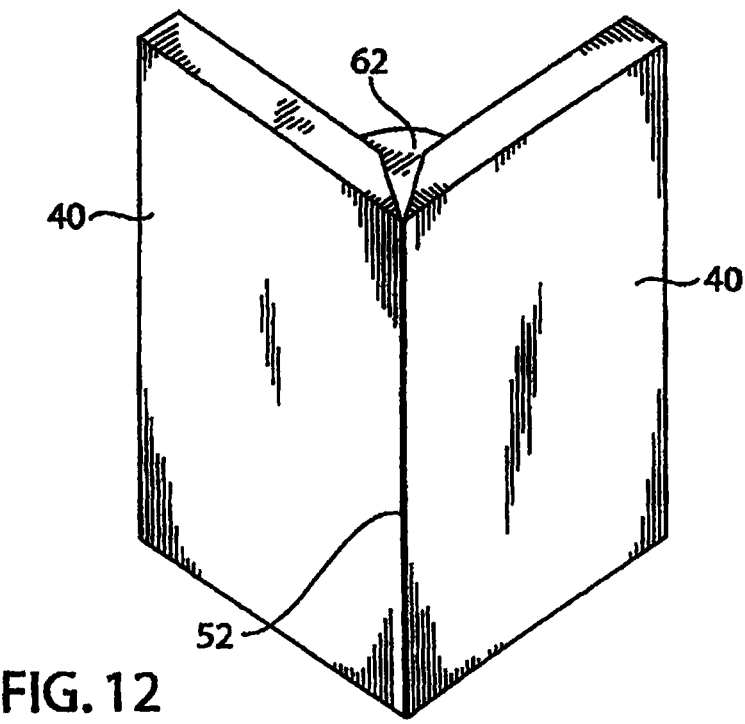
FIG. 12 is a back perspective view of the contacting pair of lining sheets shown in FIG. 10, and further illustrating an infused weld joining the pair of lining sheets which infused weld is constructed in accordance with and embodying one or more aspects of the present disclosure.
Figure 13:
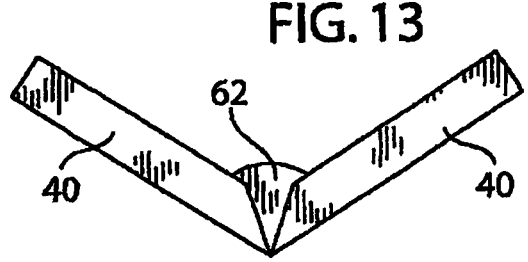
FIG. 13 is a plan view of the infused welded pair of lining sheets shown in FIG. 12.

FIGS. 11 and 12 are respective front and back views of an infused weld 62 that seals the pair of sheets 40. Additionally, FIG. 13 shows a plan view of the infused weld 62 for the pair of sheets 40.

Figure 14:
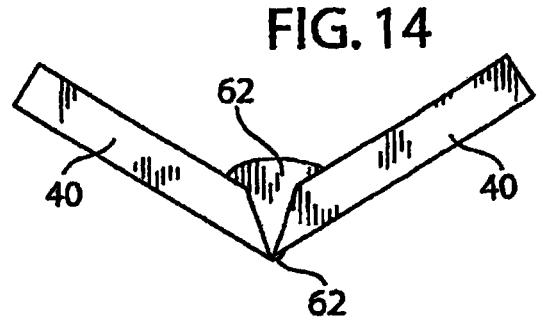
FIG. 14 is a plan view of an infused weld of the present disclosure, and illustrating a portion of the infused weld extending beyond the beveled regions of the pair of lining sheets, wherein this portion of the weld is exaggerated for purposes of clarity.

FIG. 14 illustrates an exemplary embodiment in which thermoplastic material 60 may weld the beveled region 56 between the pair of sheets 40 and slightly infuse beyond the sheets 40, for example, to further seal the tank 28. FIG. 14 exaggerates the amount of infused thermoplastic material 60 beyond the interface 54 for purposes of clarity. Since the weld infuses within the sheets 40, the weld 62 may also fill voids that exist between the sheets 40 and the tank weld or other components of the tank 28. Should the lining 26 shrink via interaction of the lining 26 with a particular content such as a chemical, then the infused weld 62 maintains the integrity of the lining 26 and maintains the sealing effect of the lining 26.

Returning to FIG. 10, the installer extrusion welds each corner pair of sheets 40 to the bottom sheet 44 by infusing molten thermoplastic material 60 along and in between the pair of sheets 40 and the bottom sheet 44. Accordingly, the infused material seals the pair of sheets 40 to the bottom sheet 44. Infusing molten thermoplastic material 60 comprises introducing the thermoplastic material 60 through and/or over and/or into the intersection of (the gap or beveled region 56 between) the associated sheets (the pair of sheets 40).

In an exemplary embodiment in which the edges of the bottom sheet 44 and the bottom edges of the pair of sheets 40 are beveled, the extrusion welding infuses molten thermoplastic material 60 within the gap or beveled region 56 between the pair of sheets 40 and the bottom sheet 44. In another exemplary embodiment in which the edges of the bottom sheet 44 and the bottom edges of the pair of sheets 40 are nonbeveled, the extrusion welding infuses molten thermoplastic material 60 within the interface between the pair of sheets 40 and the bottom sheet 44. The extrusion welding preferably infuses molten thermoplastic material 60 for any combination of beveled and non-beveled edges for the pair of sheets 40 and the bottom sheet 44. In welding the pair of sheets 40 to the bottom sheet 44, the installer typically welds from the left to the right as shown in FIG. 10 illustrating the installer extrusion welding the pair of sheets 40 to the bottom sheet 44.

The extrusion weld 62 reinforces the material of the lining 26 from reduction of the physical properties of the lining material that may occur during the installation process. The extrusion weld 62 is different from other welds, such as the "cap over" flat strip weld or "cap over" corner strip weld previously discussed above in the background section. In exemplary embodiments in which the infusion of the thermoplastic material 60 is an automated process via the extrusion welder 58, the thermoplastic material 60 is applied under controlled parameters, such as constant pressure and constant temperature over time, which, in turn, helps to minimize, reduce, or preferably eliminate pinholes. Also in exemplary embodiments, the extrusion welder 58 controls melt pressure and melt temperature with a display and control box for convenient operation and monitoring. Because of the controlled pressure and temperature, the extruded thermoplastic material 60 may thus fuse more material within the sheets 38 than other weld methods. With this automatic application of thermoplastic material 60 under controlled parameters, a thicker, deeper, and stronger extrusion weld 62 may be created while also reducing, minimizing, or preferably eliminating pinholes.

FIG. 15 illustrates an exemplary embodiment of a corner insert 64, which may be extrusion welded to a corner of a lining (FIG. 16). In the illustrated embodiment of FIG. 15, the insert 64 is configured (e.g., molded, etc.) to have a triangular shape. For example, the insert 64 may be generally hollow and have a truncated triangular pyramidal configuration (triangular pyramidal frustum).

The insert 64 may be made from a wide variety of materials. For example, the insert 64 may be made from the same material as the lining 26. Or, for example, the insert 64 may be made from a different material than the lining 26. By way of example, the insert 64 and/or lining 26 may be made from rigid polyvinylchloride, chlorinated polyvinyl chloride (CPVC), polyethylene, polypropylene, polyvinylidene fluoride (PVDF), Kynar® polyvinylidene fluoride (PVDF), etc.

The insert 64 may vary in size. For example, the insert 64 may have a thickness within a range of about 3/16 inches to about 3/8 inches. The installer may position an insert 64 at one or more corners 66 of the lining 26. For example, an insert 64 may be positioned at each corner 66 of the lining 26. As shown in FIG. 10, a corner 66 is formed by the pair of sheets 40 and bottom sheet 44 of the lining 26.

FIG. 16 illustrates a corner insert 64 after an installer has extrusion welded the insert 64 to the infused pair of sheets 40 and the bottom sheet 44. As shown, extrusion welding the insert 64 to the lining corner 66 comprises infusing molten thermoplastic material 60 at a predetermined distance beyond the insert 64 and along the infused pair of sheets 40 and bottom sheet 44. In this example, infusing molten thermoplastic material 60 comprises introducing the thermoplastic material 60 through and/or over and/or into the intersection (the beveled region 56) of the associated sheets and insert 64. Thermoplastic material 60 is infused under the controlled parameters of constant pressure and constant temperature over time to help reduce, minimize, or preferably eliminate pinholes. This welding enhances the strength of the weld 68 between the insert 64 and the lining corner 66. In an exemplary embodiment, the predetermined distance beyond the insert 64 has a range of about two inches to about four inches. The installer may then repeat the welding of inserts 64 to each of the remaining corners 66 of the lining 26.

In exemplary embodiments, a lining (e.g., lining 26 (FIG. 5), lining 226 (FIG. 24), etc.) or liner (e.g., liner (FIG. 23), etc.) may include molded corner inserts at one or more corners (e.g., at each corner, etc.) to provide additional protection in the corners. Other exemplary embodiments include tanks having molded corner inserts at one or more corners (e.g., at each corner, etc.), which tanks are formed similarly to the liner 26 such that the tank's walls and bottom are formed by sheets extrusion welded together by infused thermoplastic material.

With further reference to FIG. 5, the installer bonds other sheets 42 of the plurality of sheets 38 to the remaining surfaces of the tank 28. After bonding sheets 42 to the remaining surfaces of the tank 28, the installer welds contacting edges of any adjacent sheets 42 to any respective bonded sheet 38. The installer bonds respective sheets 42 adjacent to the second edges 48 of each of the corner pair of sheets 40. In particular, the installer bonds the edges of the other sheets 42 in contact with the second edges 48 of the pair of sheets 40. In this position, the installer may extrusion weld the other sheets 42 to the adjacent second edges 46 of the pair of sheets 40. For example, FIG. 8 illustrates an exemplary embodiment in which the installer butt-welds the straight edges of adjacent sheets 40, 42.

In the exemplary embodiment shown in FIG. 9, the installer extrusion welds between beveled edges of adjacent sheets 40, 42 such that an infused weld 62 is between the beveled edges. In this example, infusing molten thermoplastic material 60 comprises introducing the thermoplastic material 60 through and/or over and/or into the intersection (the beveled region 56) of the associated sheets. Also in this exemplary embodiment, thermoplastic material 60 is infused under the controlled parameters of constant pressure and constant temperature over time to help reduce, minimize, or preferably eliminate pinholes.

FIG. 5 generally illustrates welds (butt-weld/infused weld) that bond corner sheets 40 to side sheets 42. Multiple side sheets 42 may be bonded and welded on any particular wall 30 of the tank 28 depending on the relative size of the tank 28 to the sheets 42. As the tank 28 may have a substantially tall height, ascending rows of corner sheets 40 and side sheets 42 may be bonded and welded under the previously discussed processes.

Table 1 lists strength test results for a variety of weld locations for the welds of the present disclosure and prior art welds. The tests were conducted on an Instron Model 1122 1,000 lb. load cell, wherein the welds tested were used with Koroseal® material. In the table, the "base" refers to the stock material with no welds whatsoever. The "corner extrusion weld" position refers to a welding process of the present disclosure for welding a pair of side sheets. The "prior art weld" position refers to conventional or current welding processes, such as the strip weld process previously discussed above in the background section. The "butt weld" position refers to a welding process of the present disclosure as previously discussed and shown in FIG. 8. As shown in Table 1, welding processes of the present disclosure result in higher weld strengths than the prior art welds.

TABLE 1

| Weld | Material Thickness | Temperature | Failure Load pounds per inch | Weld Strength pounds per inch |
|---|---|---|---|---|
| Base | 3/32 inch | 70° F. | 233 | 245 |
| Corner Extrusion Weld | 3/32 inch | 70° F. | 228 | 228 |
| Prior Art Weld | 3/32 inch | 70° F. | 163 | 165 |
| Base | 3/16 inch | 70° F. | 485 | 414 |
| Corner Extrusion Weld | 3/16 inch | 70° F. | 324 | 317 |
| Prior Art Weld | 3/16 inch | 70° F. | 306 | 227 |
| Corner Extrusion Weld | 3/16 inch | 180° F. | 135 | 98 |
| Prior Art Weld | 3/16 inch | 180° F. | 78 | 54 |
| Butt Weld | 3/16 inch | 70° F. | 405 | 397 |

FIG. 17 illustrates an exemplary embodiment of a resulting lining 26 formed by a process of the present disclosure as disclosed herein. As illustrated, the lining 26 comprises the bottom sheet 44 and the pairs of sheets 40. Each pair has the first edge 46 and the second edge 48 that may be beveled forming the beveled region 56 between each pair of sheets 40. The lining 26 further comprises the infused weld 62 along and within the interface 54 between the corner sheets 40. The infused weld 62 also fills the gap or void between the corner sheets 40. The extrusion weld 62 seals the pair of sheets 40 to each other and to the bottom sheet 44 while preferably eliminating pinholes.

The lining 26 further comprises the insert 64 welded to the lining corner 66 (FIG. 15), which corner 66 is formed by the pairs of sheets 40 and the bottom sheet 44. As previously noted, the thickness of each sheet 40 may be at least 3/32 inches. The thickness of the insert 64 (FIG. 16) may have a range of about 3/16 inches to about 3/8 inches. The lining 26 may also comprise intermediate side sheets 42 that may be welded to the second edges 48 of the pair of each of the sheets 40.

Some contents stored or processed in tanks or pits become more reactive when in contact with ambient air. For example, chrome solutions become more reactive as the chrome solution contacts ambient air. PVC is particularly susceptible to attack by chrome solutions. Accordingly, process tanks may include a sacrificial layer of material at the top of the process tank, which is exposed to the ambient air. The reactive solution chemically attacks the sacrificial layer. When the sacrificial layer nears the end of its useful life, the installer may then remove the sacrificial layer and replace it with a new sacrificial layer. This replacement process for conventional linings or linings having a sacrificial layer, however, is an expansive and labor intensive process. Currently, sacrificial layers use a double thickness of bonded High Performance Koroseal®, which protects the bonded-to-metal lining beneath it for a period of time, such as one to six years.

Figure 18:
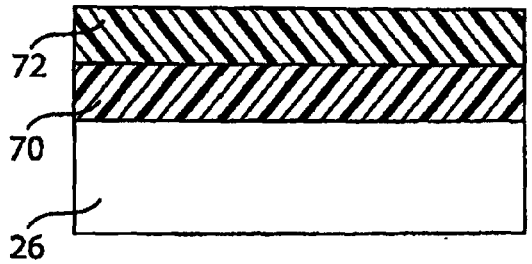
FIG. 18 is a partial side view of an exemplary embodiment of the present disclosure illustrating a sacrificial layer and an intermediate layer bonded to a lining.

FIG. 18 illustrates an exemplary embodiment of a lining or liner 26 having an intermediate layer 70 and sacrificial layer 72. In this example, the intermediate layer 70 is bonded to the liner or lining 26. In an exemplary embodiment, the intermediate layer 70 comprises a rigid PVC material although other materials may also be used.

Next, the sacrificial layer 72 is affixed to the intermediate layer 70. In an exemplary embodiment, the sacrificial layer 72 comprises a polyvinylidene fluoride (PVDF) material commonly known as Kynar® PVDF. Other materials may also be used for a sacrificial layer or skirt, such as polytetrafluoroethylene (PTFE), etc.

Figure 19:
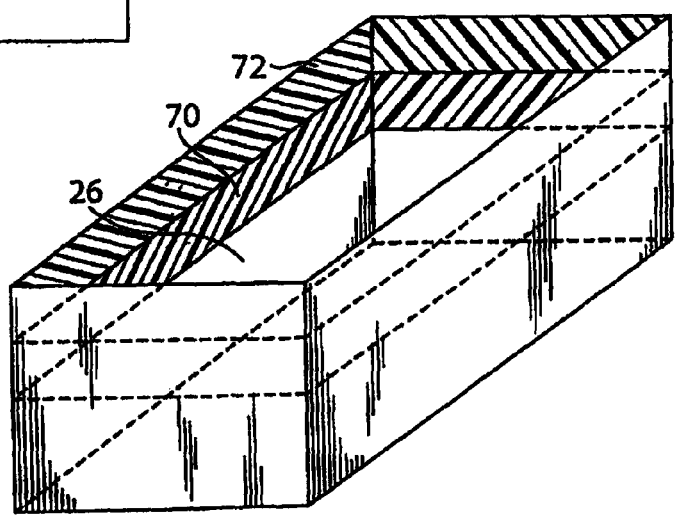
FIG. 19 is a front perspective view illustrating the lining and the sacrificial layer and intermediate layer bonded to the lining shown in FIG. 18.

The sacrificial layer 72 may be affixed along the length of the intermediate layer 70 by welding the sacrificial layer 72 to the intermediate layer 70 using, for example, a weld material that comprises a hybrid rod material known as JSR #1. FIG. 19 illustrates the liner or lining 26 bonded with the intermediate layer 70, and the sacrificial layer 72 affixed to the intermediate layer 70.

Figure 20:
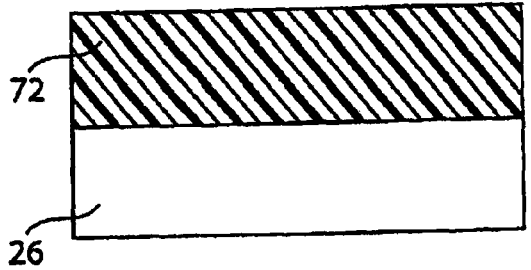
FIG. 20 is a partial side elevation view of an exemplary embodiment of the present disclosure illustrating a sacrificial layer bonded to a lining.
Figure 21:
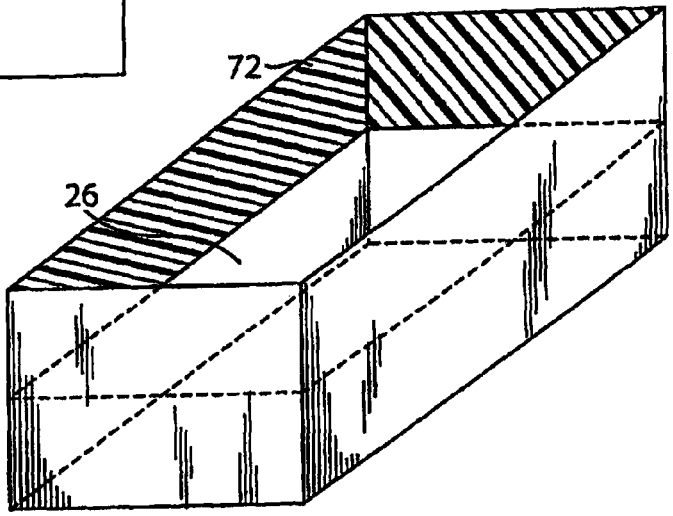
FIG. 21 is a front perspective view of illustrating the lining and the sacrificial layer bonded to the lining shown in FIG. 20.
Figure 22:
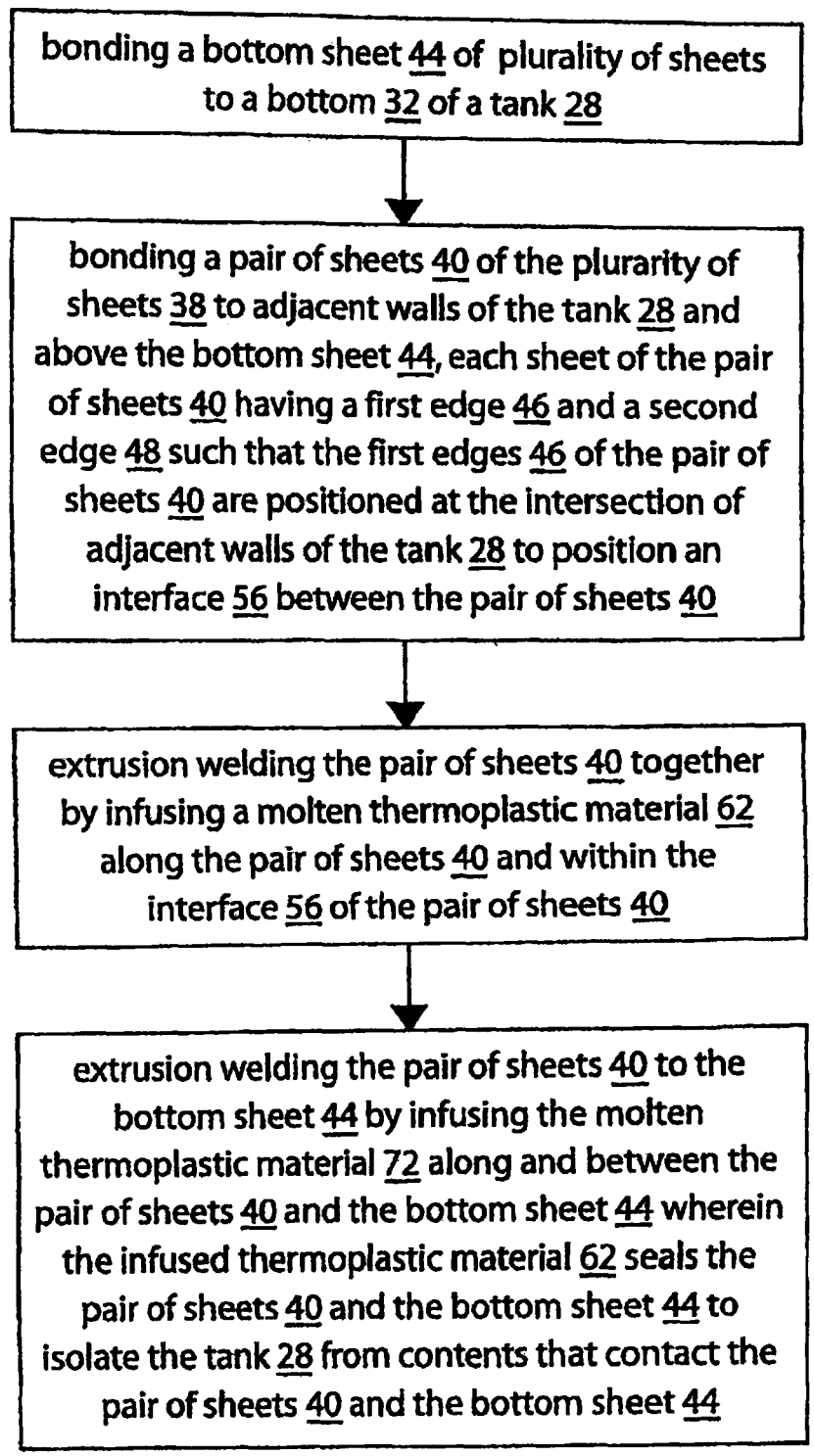
FIG. 22 is a flowchart illustrating welding steps of an exemplary embodiment of a method for lining a tank in accordance with and embodying one or more aspects of the present disclosure.

FIG. 20 illustrates an exemplary embodiment in which a sacrificial layer 72 (e.g., PVDF, etc.) is directly affixed over a lining, liner, or corrosion barrier 26. In this example, sacrificial layers 72 may be welded to the lining 26, for example, by using the hybrid rod material known as JSR #2 (soft). FIG. 21 illustrates the lining 26 welded to the sacrificial layer 72.

In the exemplary embodiment illustrated in FIGS. 18-21, the heights of the intermediate and sacrificial layers 70, 72 may be adjustable to accommodate varying levels of corrosive solutions dispersed within the tank. In another exemplary embodiment, a sacrificial layer 72 may be affixed to an intermediate layer 70 or to a lining 26 in a loose or sliding arrangement so that the sacrificial layer 72 can handle thermal expansion and contraction as the sacrificial layer 72 heats and cools in response to chemical reactions.

In some tank applications, parts that are being processed may damage the bottom sheet due to the part's weight and configuration. For example, an operator may mishandle a part while lowering the part in the solution. As such, the part may rapidly and uncontrollably drop into the tank and tear the bottom sheet. As another example, a part may dislodge from its carrier and drop into the tank and tear the bottom sheet. Some current process tanks are protected by chemical resistant masonry sheathings ("acid brick"). While these brick linings are not hydrostatically tight as a tank lining, (in fact, these brick linings are porous), the brick linings do offer both thermal and mechanical protection to the bottom sheet of the liner or lining. Acid brick has a very high cost factor as it must be installed on site and must be removed and replaced if the tank needs eventual relining. For some applications (hard chrome plating, for example), the used brick layer is considered hazardous waste leading to increased risks for personnel and to increased disposal costs.

Accordingly, an exemplary embodiment (not shown) of a lining further includes an absorption layer or impact absorbing bumper pad positioned over and/or bonded to the top of the bottom sheet. This impact protective layer may comprise a honeycomb, egg-crate, and/or laminate structure, such as a non-float (high specific gravity) thermoplastic. The structure may also comprise compressible material that absorbs impact from dropped parts. By being made of pieces of a size and weight easily handled by installation personnel, this structure is easily removed from the tank bottom if a lining repair on or near the bottom is required.

Figure 23:
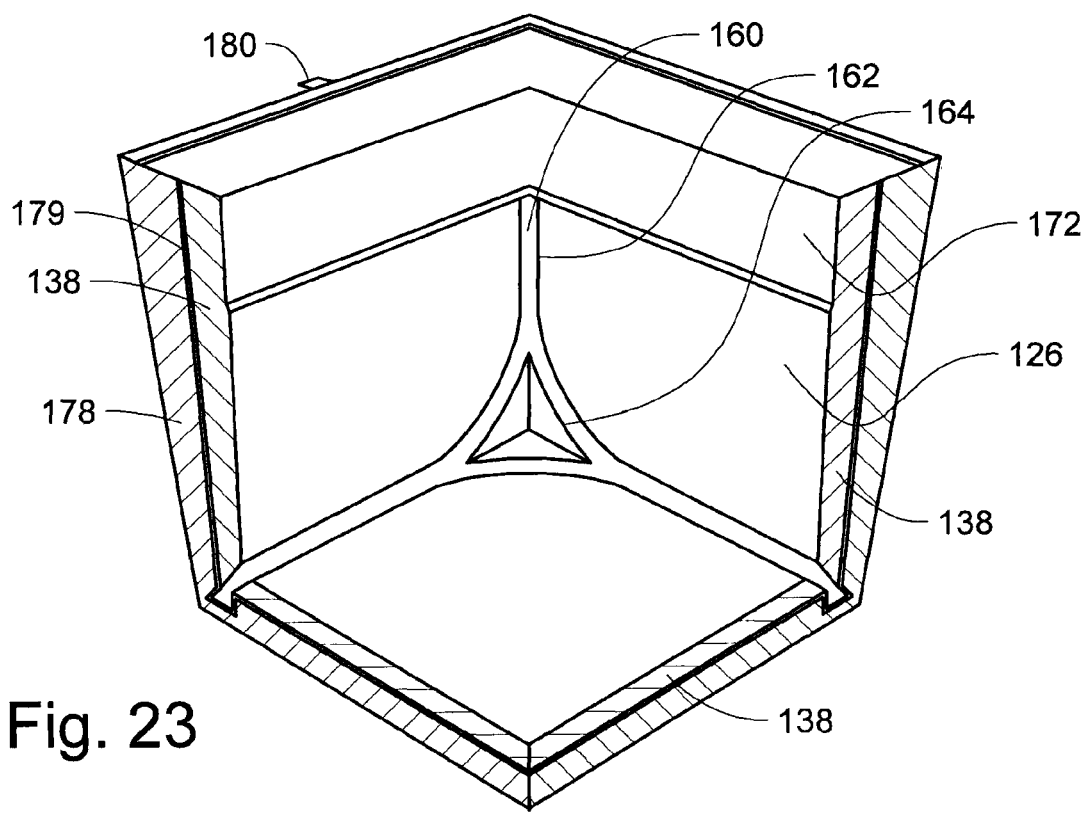
FIG. 23 is a partial perspective view of an exemplary embodiment of a liner that includes an outer shell, an inner lining in which infused welds join the sheets of the lining, and a corner insert is welded to a corner of the lining in accordance with and embodying one or more aspects of the present disclosure.

FIG. 23 illustrates an exemplary embodiment of a liner that may be positioned within or applied to a tank. For example, the liner may be used as a "drop-in" free-standing liner that is positioned within a tank without bonding the liner to the tank's surfaces. In other exemplary embodiments, the liner shown in FIG. 23 may be used instead as a lining, which is bonded to a tank's surfaces.

As shown in FIG. 23, the liner includes an inner lining 126 and an outer shell 178. The lining 126 includes sheets or panels 138 separated by gaps along their edges. The sheets 138 are joined by an infused weld 162 formed by extrusion welding, such that the infused weld 162 also fills the gaps between the sheets 138. During the extrusion welding, molten thermoplastic material 160 infuses within the gaps separating the sheets 138.

A corner insert 164 (e.g., molded triangular insert, etc.) is extrusion welded to a corner of the inner lining 126, which provides double protected corners. A skirt or sacrificial layer 172 is also provided, which may be formed from Teflon® polytetrafluoroethylene (PTFE) or other suitable material.

In this exemplary embodiment, double sided electrically-conductive adhesive tape or bonding adhesive 179 may be used between the lining 126 and shell 178, which has a ground connection to allow for leak detection, permeation monitoring, DC spark testing, etc. Alternative electrically-conductive adhesives, coatings, mediums, etc. may also be used.

The liner shown in FIG. 23 also includes a pre-leak checking tab 180 (e.g., metal "spark" test tab, etc.). The pre-leak checking tab 180 and electrically-conductive medium between the outer shell 178 and inner lining 126 allows pre-leak testing, such as by "spark" testing and/or by a testing method disclosed in U.S. Pat. No. 7,111,497 the entire contents of which is incorporated herein by reference. Prompt detection of leaks allows for repair before damage becomes extensive to the tank.

Various materials may be used for the lining's sheets 138, thermoplastic material 160, corner inserts 164, and outer shell 178, such as the exemplary materials referred to above. In an exemplary embodiment, the lining sheets 138, thermoplastic material 160, and corner inserts 164 may comprise plasticized polyvinyl chloride (e.g., Koroseal® material, etc.), while the outer shell 178 comprises a high-impact polyvinyl chloride shell.

The thermoplastic material 160 may comprise permanent thermoplastic lining materials such as, but not limited to, plasticized polyvinyl chloride, flexible polyvinyl chloride (F-PVC), rigid polyvinyl chloride, chlorinated polyvinyl chloride (CPVC), polyethylene (e.g., high molecular weight polyethylene (HMWPE), high-density polyethylene (HDPE), low-density polyethylene (LDPE), etc.), polyurethane/PVC alloy, synthetic rubber, fluoropolymer (homopolymer, copolymers (e.g., Poly(vinylidene fluoride-co-hexafluoropropene) (PVDF-HFP), etc.) or alloys), ethylene-chloro-tri-fluoro-ethylene (Halar ECTFE), laminations of thermoplastic materials such as above, etc. By way of further example, the lining 126, inserts 164, and/or shell 178 may be made from rigid polyvinylchloride, chlorinated polyvinyl chloride (CPVC), polyethylene, polypropylene, copolymer polypropylene, polyvinylidene fluoride (PVDF), Kynar® polyvinylidene fluoride (PVDF), etc.

Accordingly, the exemplary embodiment illustrated in FIG. 23 may advantageously provide a double barrier protection via the inner lining 126 and outer shell 178, such that there is triple protection when the liner is within a tank. Depending on the particular contents to be stored and/or processed, the liner illustrated in FIG. 23 may also be used as a tank itself for storing and/or processing contents without the liner having to be positioned within a tank. The exemplary embodiment illustrated in FIG. 23 may advantageously have a relatively long service life, solid, strong, and fewer welds as compared to conventional liners.

FIG. 24 illustrates an exemplary embodiment of a lining 226 applied to walls 230 of a tank 228. As shown, the lining 226 includes sheets or panels 238 separated by a gap 256. The sheets 238 are joined by an infused weld 262 that also fills the gap 256 between the sheets 238. During the extrusion welding, molten thermoplastic material 260 infuses within the gap 256 separating the sheets 238. The infused thermoplastic material 260 seals the sheets 238 and isolates the lined tank 228 from contents (e.g., contents being stored and/or processed, etc.) within the lined tank 228, as the contents contact the sheets 238 of the lining 226 instead of the tank walls 230.

Molten thermoplastic weld material 260 flows into and fills the gap 256 between the sheets 238 and penetrates the joint to the tank wall 230. An infused weld area 262 is thus created that helps eliminate channels, pinholes, gaps, etc. behind the weld seams, which, in turn, helps reduce the probability of leaks and helps increase the service life of the tank 228. If a leak happens, then the weld 262 also helps block solution from flowing behind the lining 226.

The sheets 238 may be attached to the tank walls 230 by double sided adhesive tape (e.g., 3M VHB tape, etc.). Alternatively, other suitable attachment means (e.g., adhesive cement, etc.) may be used for attaching the sheets 238 to and holding them in place relative to the tank walls 230 with the gap 256 between adjacent sheets 238. In this exemplary embodiment and/or other exemplary embodiments disclosed herein, double sided electrically-conductive adhesive tape may be used between the lining 226 and tank 228. The use of an electrically-conductive tape between the lining 226 and tank 228 allows pre-leak testing, such as "spark" testing and/or by a testing method disclosed in U.S. Pat. No. 7,111,497 the entire contents of which is incorporated herein by reference. Prompt detection of leaks allows for repair before damage becomes extensive to the tank.

Also in this embodiment (as in other embodiments disclosed herein), various materials may be used for the lining sheets 238 and thermoplastic material 260 including those materials referred to above. In an exemplary embodiment, the lining sheets 238 may be made out of plasticized polyvinyl chloride (e.g., Koroseal® material, etc.). The thermoplastic material 260 may comprise permanent thermoplastic lining materials such as, but not limited to, plasticized polyvinyl chloride, flexible polyvinyl chloride (F-PVC), rigid polyvinyl chloride, chlorinated polyvinyl chloride (CPVC), polyethylene (e.g., (high molecular weight polyethylene (HMWPE), high-density polyethylene (HDPE), low-density polyethylene (LDPE), etc.), polyurethane/PVC alloy, synthetic rubber, fluoropolymer (homopolymer, copolymers (e.g., Poly(vinylidene fluoride-co-hexafluoropropene) (PVDF-HFP), etc.) or alloys), ethylene-chloro-tri-fluoro-ethylene (Halar ECTFE), laminations of thermoplastic materials such as above, etc.

Accordingly, the exemplary embodiment illustrated in FIG. 24 may advantageously have a relatively long service life, have welds that are solid and strong (more tolerable to stresses), and have fewer welds as compared to conventional linings. The lining 126 may also include corner inserts (e.g., insert 64, etc.) as disclosed herein, which, in turn, provide double protected corners.

FIG. 25 illustrates an exemplary embodiment of a sheet or piece 338 of lining material applied to a wooden flooring member 390. As shown, an infused weld 362 joins the liner sheet 338 to the flooring member 390. During extrusion welding, molten thermoplastic material 360 infuses into a gap 356 (e.g., an inverted v-shaped notch, dovetail shaped notch, etc.) in the flooring member 390 to bond the piece or sheet 338 of lining material to the flooring member 390. In other embodiments, liners or linings disclosed herein may also be used for lining non-wooden floors, such as a concrete floor in a containment area, etc.

As disclosed herein, exemplary embodiments include welds that are formed with extrusion welding machines such that the welds are preferably designed to eliminate gaps resulting from imperfect hand welded seams. Exemplary embodiments may further include molded corner inserts for double protection in the corners. In some exemplary embodiments in which a liner or lining is intended for a large tank, a liner or lining may include full-size RF (radio frequency) welded high performance Koroseal® panels (e.g., Koroseal® flexible PVC sheets, etc.) to eliminate lining seams in tank walls and bottom. For example, if a tank is very large, a lining may include large sub-panels joined by skived edges with overlapped extrusion welds. This, in turn, may help avoid entrapped air, similar to rubber lining joints, and eliminate hand welds with seam strips in immersion service.

The inventor has developed and discloses herein hot gas/hot air extrusion welding machine techniques that overcome disadvantages that are characteristic of hand-welding, such as channels, pinholes, and gaps that can form behind hand welded seams and allow the solution in a tank or pit to flow behind the lining and corrode the substrate if a leak occurs. As disclosed herein, the inventor's techniques modify the preheating process and delivery of the weld material. For example, and as disclosed herein for exemplary embodiments, a welding machine extrudes a high-performance, plasticized PVC weld material that infuses into the substrate's pores and voids as well as joins the PVC sheet linings. Rather than extending the sheet linings on a sidewall and bottom of a tank or pit so that they meet at a 90-degree joint, the sheet linings are configured or shortened to leave a relatively small gap at the joint. This allows molten thermoplastic weld material to flow into and fill the gap between the lining sheets and penetrate the joint to the substrate (e.g., the tank wall, etc.). An infused weld area is thus created that helps eliminate channels, pinholes, and gaps behind the weld seams, which, in turn, helps reduce the probability of leaks, and helps increase the service life of the tank, pit, storage vessel, etc. Should a leak happen, the weld helps block solution from flowing behind the lining.

Also with the inventor's hot gas/hot air extrusion welding machine techniques the welding rod may be fully melted, which results in a homogenous weld with fewer stresses. The weld may be formed in a single pass, further reducing stresses introduced by the multiple passes common in traditional hand welding. The inventor's extrusion welding is faster and is less sensitive to surface oxidation.

As recognized by the inventor hereof, the inner bottom corners where three intersecting lining sheets must be joined are typical problem areas and a frequent source of early leaks and premature lining failures with conventional linings in that it is difficult to perform a high-quality weld in a corner. This is because high-quality welds need the right speed, temperature, and pressure as the welding machine is moved along the joint. But at a corner, the lining sheets can't be preheated because the welding machine stops. To address this problem, the inventor hereof has disclosed exemplary embodiments of molded thermoplastic corner inserts, which enable the welding machine to weld continuously in the corners without having to stop at the corners.

Exemplary embodiments of linings and liners disclosed herein may be used with virtually any type of (e.g., for different uses, formed from different materials (e.g., steel, fiberglass, rubber, lead, plastic, etc.) different shapes and sizes, etc.) process tank, indoor or outdoor containment pit, other storage or liquid containment vessels, etc. Exemplary embodiments may also be configured as relatively rigid "drop-in" thermoplastic liners which possess superior perimeter machine welds which are mechanically anchored to the tank or to a framework for placement into the tank in a manner such that the liner does not float in the tank.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used, etc.) and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of providing a liner or lining for a tank, the method comprising:
   positioning a pair of sheets adjacent each other to form a gap therebetween;
   extrusion welding the pair of sheets together by infusing a molten thermoplastic material along an interface and within the gap between the pair of sheets;
   positioning the pair of sheets adjacent a bottom sheet to form a gap between the pair of sheets adjacent and the bottom sheet;
   extrusion welding the pair of sheets to the bottom sheet by infusing the molten thermoplastic material along an interface and within the gap between the pair of sheets and the bottom sheet; and
   positioning the pair of sheets and the bottom sheet within a tank;
   wherein another gap is adjacent at least one wall of the tank and at least one of the bottom sheet and a sheet of the pair of sheets, and wherein extrusion weld material is infused within said another gap and penetrates to the at least one wall of the tank.

2. The method of claim 1, wherein positioning the pair of sheets and bottom sheet within the tank includes positioning the pair of sheets and bottom sheet within the tank after the extrusion welding.

3. The method of claim 1, wherein the thermoplastic material infused within the gap seals the pair of sheets and bottom sheet and isolates contents that contact the pair of sheets and bottom sheet from the tank.

4. The method of claim 1, wherein the pair of sheets and the bottom sheet comprise plasticized polyvinyl chloride sheets.

5. The method of claim 1, wherein extrusion welding includes:
   moving a portable extrusion welder near the interface between the pair of sheets;
   activating the portable extrusion welder to generate and discharge the molten thermoplastic material;
   controlling the pressure and temperature of the discharged molten thermoplastic material;
   infusing the molten thermoplastic material from the portable extrusion welder, along the pair of sheets and within the exposed interface of the pair of sheets at the controlled pressure and temperature; and
   infusing the molten thermoplastic material along and between the pair of sheets and the bottom sheet at the controlled pressure and temperature.

6. A lining, liner, or tank produced according to the method of claim 1.

7. A lining for a tank, comprising a bottom sheet and a plurality of side sheets, the plurality of side sheets configured such that a gap is between a pair of adjacent side sheets of the plurality of side sheets, the pair of adjacent side sheets joined by an extrusion weld infused within the gap and along an interface between the pair of adjacent side sheets, wherein the lining defines an internal volume usable for storage of materials and wherein the pair of adjacent side sheets are joined by the extrusion weld without a filler rod in the gap therebetween, wherein the gap is a first gap, wherein a second gap is adjacent at least one wall of the tank and at least one of the bottom sheet and a side sheet of the pair of adjacent side sheets, and wherein extrusion weld material is infused within the second gap and penetrates to the at least one wall of the tank.

8. The lining of claim 7, wherein each side sheet of the pair of adjacent side sheets include a beveled edge such that the gap is defined between the beveled edges of the pair of adjacent side sheets.

9. The lining of claim 7, wherein:
   the pair of adjacent side sheets is joined to the bottom sheet by an extrusion weld; and
   an insert at a corner formed by the pair of adjacent side sheets and bottom sheet.

10. The lining of claim 7, further comprising a molded triangular insert extrusion welded at a corner formed by the pair of adjacent side sheets and bottom sheet.

11. The lining of claim 7, wherein the extrusion weld comprises thermoplastic material and the plurality of side sheets comprise plasticized polyvinyl chloride sheets, whereby the extrusion weld is formed by infusing molten thermoplastic material within the gap such that the thermoplastic material fills the gap.

12. The lining of claim 7, wherein:
   the plurality of side sheets are configured such that a gap is between each pair of adjacent side sheets of the plurality of side sheets;
   each pair of adjacent side sheets are joined by an extrusion weld infused within the gap and along an interface between each corresponding pair of adjacent side sheets; and
   the plurality of side sheets are joined to the bottom sheet by an extrusion weld.

13. The lining of claim 7, wherein the bottom sheet and the plurality of side sheets are configured for use as a drop-in liner for the tank.

14. A liner comprising the lining of claim 7 and an outer shell coupled to the lining.

15. The liner of claim 14, wherein:
   the lining comprises flexible polyvinyl chloride;
   the outer shell comprises rigid polyvinyl chloride; and
   electrically-conductive material is disposed between the lining and the outer shell, such that the electrically-conductive material with a ground connection allows for leak detection, permeation monitoring, and/or spark testing.

16. A tank comprising the lining of claim 7.

17. A tank comprising a lining that comprises a bottom sheet and a plurality of side sheets, the plurality of side sheets configured such that a gap is between a pair of adjacent side sheets of the plurality of side sheets, the pair of adjacent side sheets joined by an extrusion weld infused within the gap and along an interface between the pair of adjacent side sheets, wherein the lining defines an internal volume usable for storage of materials, wherein the pair of adjacent side sheets are joined by the extrusion weld without a filler rod in the gap therebetween, wherein the gap is a first gap, wherein the tank includes a wall having a second gap adjacent at least one of the bottom sheet and a side sheet of the pair of adjacent side sheets, and wherein the at least one of the bottom sheet and the side sheet of the pair of adjacent side sheets is joined to the wall by an extrusion weld infused within the second gap of the wall.

18. The tank of claim 16, wherein the bottom sheet is bonded to a bottom of the tank and wherein the pair of sheets are bonded to sidewalls of the tank.

19. A tank comprising a plurality of surfaces and a liner having a bottom sheet and a plurality of side sheets, the plurality of side sheets configured such that a gap is between a pair of adjacent side sheets of the plurality of side sheets, the pair of adjacent side sheets joined by an extrusion weld infused within the gap and along an interface between the pair of adjacent side sheets, wherein the bottom sheet is joined to the pair of adjacent side sheets by an extrusion weld within a gap between and along an interface between the bottom sheet and the pair of adjacent side sheets, wherein the pair of adjacent side sheets are joined by the extrusion weld without a filler rod in the gap therebetween, wherein the bottom sheet is joined to the pair of adjacent side sheets by the extrusion weld without a filler rod in the gap therebetween, wherein another gap is adjacent at least one surface of the plurality of surfaces of the tank and at least one of the bottom sheet and a side sheet of the pair of adjacent side sheets, and wherein extrusion weld material is infused within said another gap and penetrates to the at least one surface of the tank.

20. The tank of claim 19, wherein the liner is positioned within the tank after the pair of adjacent side sheets are joined by the extrusion weld.

21. The tank of claim 19, wherein each side sheet of the pair of adjacent side sheets include a beveled edge such that the gap is defined between the beveled edges of the pair of adjacent side sheets.

22. The tank of claim 21, further comprising an insert extrusion welded at a corner formed by the pair of adjacent side sheets and bottom sheet.

23. The tank of claim 17, wherein the wall includes a wooden wall.

24. The tank of claim 17, wherein the second gap includes at least one of an inverted v-shaped notch and a dovetail shaped notch.

25. The tank of claim 17, wherein the wall includes a floor.

* * * * *